United States Patent
Utsunomiya et al.

(10) Patent No.: US 10,449,720 B2
(45) Date of Patent: Oct. 22, 2019

(54) SOLID OBJECT SHAPING APPARATUS, CONTROL METHOD FOR SOLID OBJECT SHAPING APPARATUS, AND CONTROL PROGRAM FOR SOLID OBJECT SHAPING APPARATUS

(71) Applicant: SEIKO EPSON CORPORATION, Tokyo (JP)

(72) Inventors: Kohei Utsunomiya, Nagano (JP); Satoshi Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 336 days.

(21) Appl. No.: 14/978,207

(22) Filed: Dec. 22, 2015

(65) Prior Publication Data
US 2016/0243760 A1 Aug. 25, 2016

(30) Foreign Application Priority Data
Feb. 19, 2015 (JP) .................. 2015-030152

(51) Int. Cl.
*B29C 64/112* (2017.01)
*B29C 64/386* (2017.01)
(Continued)

(52) U.S. Cl.
CPC .......... *B29C 64/386* (2017.08); *B29C 64/112* (2017.08); *B29K 2105/0058* (2013.01);
(Continued)

(58) Field of Classification Search
CPC . B29C 67/0059; B29C 64/386; B29C 64/393; B33Y 30/00; B29K 2995/0021
See application file for complete search history.

(56) References Cited

U.S. PATENT DOCUMENTS

2004/0141018 A1* 7/2004 Silverbrook ............ B22F 3/008
347/4
2004/0159978 A1  8/2004 Nielsen et al.
(Continued)

FOREIGN PATENT DOCUMENTS

| JP | 2004-230895 A | 8/2004 |
| JP | 2007-298989 A | 11/2007 |
| JP | 2013-075390 A | 4/2013 |

OTHER PUBLICATIONS

Somasekharappa, Additive Manufacturing—The Voxel Method, 3D Printing Industry, Apr. 30, 2013, 3D Printing Industry, https://3dprintingindustry.com/news/additive-manufacturing-the-voxel-method-10349/ (Year: 2013).*

*Primary Examiner* — William P Bell
*Assistant Examiner* — Andrew L Swanson

(57) ABSTRACT

A solid object shaping apparatus includes a head unit, and a curing unit, in which a model indicating a shape and a color of a solid object to be shaped is approximated with a set of voxels each having a predetermined rectangular parallelepiped shape, a unit shaping body formed by a single dot or a plurality of dots is formed in the voxel, and the solid object is shaped by using the plurality of unit shaping bodies, and in which the plurality of unit shaping bodies constituting the solid object include a first and second unit shaping body. In the second unit shaping body, two or more faces forming a surface of the second unit shaping body correspond to a surface of the solid object, and a proportion of an inner portion of the model occupying the second unit shaping body is equal to or less than a reference value.

10 Claims, 20 Drawing Sheets

(51) Int. Cl.
 *B33Y 10/00* (2015.01)
 *B33Y 30/00* (2015.01)
 *B33Y 50/02* (2015.01)
 *B29K 105/00* (2006.01)

(52) U.S. Cl.
 CPC ......... *B29K 2995/002* (2013.01); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2008/0038396 A1 | 2/2008 | John et al. |
| 2010/0249979 A1 | 9/2010 | John et al. |
| 2012/0065755 A1* | 3/2012 | Steingart ............ A61C 13/0019 700/98 |
| 2013/0040091 A1* | 2/2013 | Dikovsky ............. B29C 64/386 428/68 |
| 2017/0087772 A1* | 3/2017 | Hakkaku ............ B29C 67/0088 |

* cited by examiner

| DOT SIZE | SI[m] (b1, b2) | Sel[m] | | |
|---|---|---|---|---|
| | | Ts1 | Ts2 | Ts3 |
| LARGE DOT | (1, 1) | H | H | H |
| MEDIUM DOT | (1, 0) | H | H | L |
| SMALL DOT | (0, 1) | H | L | L |
| NON-RECORDING | (0, 0) | L | L | L |

SOLID OBJECT

SECTION OF SOLID OBJECT (INSIDE) ← → (OUTSIDE)

BL, Vx

SF

BL-in, Vx-in

BL-out, Vx-out

FIG. 17

| FILLING PROPORTION RF (COMPARED CONTENT) | BLOCK BL TO BE FORMED |
|---|---|
| $RF < \alpha 2$ | BLOCK BL IS NOT FORMED |
| $\alpha 2 \leq RF \leq \alpha 1$ | LIGHT COLOR BLOCK BL2 (HOWEVER, IDENTICAL COLOR BLOCK BL1 IN CASE OF CLEAR COLOR) |
| $\alpha 1 < RF$ | IDENTICAL COLOR BLOCK BL1 |

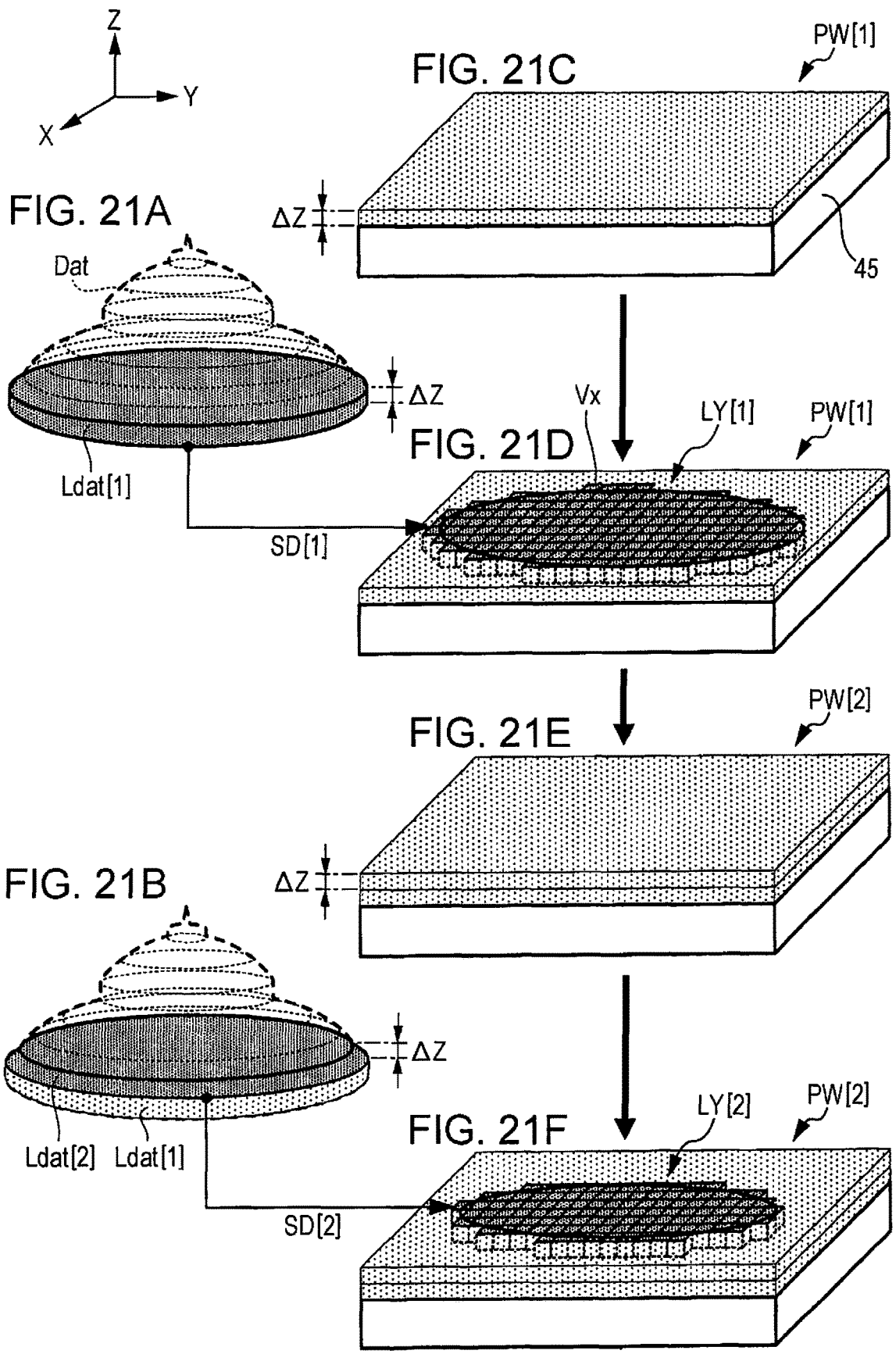

SOLID OBJECT SHAPING APPARATUS, CONTROL METHOD FOR SOLID OBJECT SHAPING APPARATUS, AND CONTROL PROGRAM FOR SOLID OBJECT SHAPING APPARATUS

This application claims priority to Japanese Patent Application No. 2015-030152 filed on Feb. 19, 2015. The entire disclosure of Japanese Patent Application No. 2015-030152 is hereby incorporated herein by reference.

BACKGROUND

1. Technical Field

The present invention relates to a solid object shaping apparatus, a solid object shaping system, a control method for the solid object shaping apparatus, and a control program for the solid object shaping apparatus.

2. Related Art

In recent years, various solid object shaping apparatuses such as 3D printers have been proposed. The solid object shaping apparatus forms a shaping layer having a predetermined thickness by using dots which are formed through ejection of a liquid such as ink, and shapes a solid object by laminating the shaping layers. In such a solid object shaping apparatus, various techniques of shaping a colored solid object have been proposed (for example, JP-A-2013-075390).

Meanwhile, in a case where a solid object is shaped as a set of dots, the shape of the solid object depends on a size of the dot. For this reason, dots forming a surface of the solid object may be visually recognized as irregularities. Particularly, in a case where a solid object with a smooth surface is shaped, if irregularities are observed, there is a problem in that the shaped solid object becomes a low-quality solid object with a rough texture lacking smoothness.

SUMMARY

An advantage of some aspects of the invention is to provide a solid object shaping apparatus which can shape a solid object with less roughness by reducing the probability that irregularities may be visually recognized.

According to an aspect of the invention, there is provided a solid object shaping apparatus including a head unit that ejects a liquid containing a colorant component; and a curing unit that cures the liquid ejected from the head unit so as to form a dot, in which a unit shaping body is formed by using the dot, and a solid object corresponding to a shape and a color indicated by a model is formed by using the plurality of unit shaping bodies, in which the plurality of unit shaping bodies constituting the solid object include a first unit shaping body having an amount of colorant components required to represent the color indicated by the model; and a second unit shaping body having an amount of the colorant components which is smaller than the amount required to represent the color indicated by the model, and in which, in the second unit shaping body, two or more faces of six faces forming a surface of the second unit shaping body correspond to a surface of the solid object.

According to the aspect of the invention, the solid object is shaped by a plurality of unit shaping bodies including the second unit shaping body having a color lighter than a color indicated by the model. A projection of irregularities of the surface of the solid object can be formed by using the second unit shaping body. In other words, a projection of irregularities which may highly possibly be visually recognized when formed by the first unit shaping body having a color indicated by the model can be formed by the second unit shaping body having a color lighter than the color indicated by the model. For this reason, it is possible to reduce the possibility that the irregularities may be visually recognized by lightening a color of the projection of the irregularities. In other words, it is possible to shape a solid object having a smooth surface with less roughness.

According to another aspect of the invention, there is provided a solid object shaping apparatus including a head unit that ejects a liquid containing a colorant component; and a curing unit that cures the liquid ejected from the head unit so as to form a dot, in which a model indicating a shape and a color of a solid object to be shaped is approximated with a set of voxels each having a predetermined rectangular parallelepiped shape, a unit shaping body formed by a single dot or a plurality of dots is formed in the voxel, and the solid object is shaped by using the plurality of unit shaping bodies, in which the plurality of unit shaping bodies constituting the solid object include a first unit shaping body having an amount of colorant components required to represent the color indicated by the model; and a second unit shaping body having an amount of the colorant components which is smaller than the amount required to represent the color indicated by the model. In the second unit shaping body, two or more faces of six faces forming a surface of the second unit shaping body correspond to a surface of the solid object, and a proportion of an inner portion of the model of the second unit shaping body to the entire second unit shaping body is equal to or less than a first reference value.

According to the aspect of the invention, the solid object is shaped by a plurality of unit shaping bodies including the second unit shaping body having a color lighter than a color indicated by the model. A projection of irregularities of the surface of the solid object can be formed by using the second unit shaping body. In other words, a projection of irregularities which may highly possibly be visually recognized when formed by the first unit shaping body having a color indicated by the model can be formed by the unit shaping body having a color lighter than the color indicated by the model. For this reason, it is possible to reduce the possibility that the irregularities may be visually recognized by lightening a color of the projection of the irregularities. In other words, it is possible to shape a solid object having a smooth surface with less roughness.

In addition, according to the aspect of the invention, the second unit shaping body is used as the unit shaping body only in a case where a proportion of the inner portion of the model occupying the unit shaping body is equal to or less than the first reference value. For this reason, it is possible to prevent the first unit shaping body having the same color as a color of the model from being formed in a voxel protruding from the model and thus to reduce the possibility that irregularities may be visually recognized.

On the other hand, in a case where the proportion of the inner portion of the model occupying the unit shaping body is more than the first reference value, the second unit shaping body can be prevented from being used as the unit shaping body, and the first unit shaping body can be used as the unit shaping body. For this reason, it is possible to prevent a shaped solid object from being visually recognized as an object having a color lighter than a color indicated by the model.

The first reference value may be a value which is greater than "0%".

According to still another aspect of the invention, there is provided a solid object shaping apparatus including a head unit that ejects a liquid containing a colorant component; a curing unit that cures the liquid ejected from the head unit so as to form a dot; and a control portion that controls the head unit so that a unit shaping body formed by a single dot or a plurality of dots is formed in a voxel, and a solid object is shaped by using the plurality of unit shaping bodies, when supplied with designation data which is data regarding a model indicating a shape and a color of the solid object to be shaped as a set of the voxels each having a predetermined rectangular parallelepiped shape and which designates the single dot or the plurality of dots to be formed in the voxel, in which the plurality of unit shaping bodies constituting the solid object include a first unit shaping body having an amount of colorant components required to represent the color indicated by the model; and a second unit shaping body having an amount of the colorant components which is smaller than the amount required to represent the color indicated by the model. In the second unit shaping body, two or more faces of six faces forming a surface of the second unit shaping body correspond to a surface of the solid object, and a proportion of an inner portion of the model of the second unit shaping body to the entire second unit shaping body is equal to or less than a first reference value.

According to the aspect of the invention, a projection of irregularities of a surface of the solid object can be formed by using the second unit shaping body having a color lighter than a color indicated by the model. For this reason, it is possible to lighten a color of the projection of the irregularities of the surface of the solid object and thus to shape the solid object having a smooth surface with less roughness.

In the solid object shaping apparatus, the six faces forming the surface of the second unit shaping body preferably include two faces forming the surface of the solid object and sharing a single side.

According to the aspect, a ridgeline which is the projection of the irregularities of the surface of the solid object can be formed by using the second unit shaping body. For this reason, it is possible to lighten a color of the projection of the irregularities of the surface of the solid object and thus to shape the solid object having a smooth surface with less roughness.

In the solid object shaping apparatus, among the six faces forming the surface of the second unit shaping body, a face on an opposite side to the face forming the surface of the solid object is preferably adjacent to the first unit shaping body.

According to the aspect, it is possible to prevent a plurality of second unit shaping bodies having a color lighter than the color indicated by the model from being linearly continuously formed. Thus, it is possible to prevent the shaped solid object from being visually recognized as an object having a color lighter than a color indicated by the model.

In the solid object shaping apparatus, preferably, the first unit shaping body is constituted of a dot formed by a first liquid containing the colorant component, the second unit shaping body is constituted of a dot formed by a second liquid containing the colorant component, and an amount of the colorant components per unit volume contained in the first liquid is larger than an amount of the colorant components per unit volume contained in the second liquid.

According to the aspect, the first unit shaping body having the same color as a color indicated by the model can be formed by the first liquid, and the second unit shaping body having a color lighter than the color indicated by the model by the second liquid. For this reason, the projection of the irregularities of the surface of the solid object can be formed by using the second unit shaping body which is formed by the second liquid, and thus it is possible to shape the solid object having a smooth surface with less roughness.

In the solid object shaping apparatus, preferably, the first unit shaping body is constituted of a dot formed by a first liquid containing the colorant component, the second unit shaping body is constituted of a dot formed by a second liquid containing the colorant component, or a dot formed by a third liquid containing the colorant component, an amount of the colorant components per unit volume contained in the first liquid is larger than an amount of the colorant components per unit volume contained in the second liquid, and the amount of the colorant components per unit volume contained in the second liquid is larger than an amount of the colorant components per unit volume contained in the third liquid.

According to the aspect, the projection of the irregularities of the surface of the solid object can be formed by using the second unit shaping body which is formed by the second liquid or the third liquid having a color lighter than a color indicated by the model, and thus it is possible to shape the solid object having a smooth surface with less roughness.

In the solid object shaping apparatus, in a case where the designation data designates the single dot or the plurality of dots to be formed in one voxel so that the first unit shaping body is formed in the single voxel, and, in a case where, in one unit shaping body formed in the one voxel, two or more faces of six faces forming a surface of the one unit shaping body correspond to a surface of the solid object, and a proportion of an inner portion of the model of the one unit shaping body to the entire one unit shaping body is equal to or less than the first reference value, the control portion preferably controls the head unit so that the second unit shaping body is formed in the one voxel.

According to the aspect, the projection of irregularities is formed by the second unit shaping body having a color lighter than a color indicated by the model. For this reason, it is possible to lighten a color of the projection of the irregularities of the surface of the solid object and thus to shape the solid object having a smooth surface with less roughness.

In the solid object shaping apparatus, the unit shaping body is assumed to be formed in an external voxel which is a voxel for which the unit shaping body is designated not to be formed by the designation data, and, in a case where, in the unit shaping body assumed to be formed in the external voxel, two or more faces of six faces forming a surface of the unit shaping body correspond to a surface of the solid object, and a proportion of an inner portion of the model of the unit shaping body to the entire unit shaping body is equal to or less than the first reference value and is equal to or more than a second reference value which is smaller than the first reference value, the control portion preferably controls the head unit so that the second unit shaping body is formed in the external voxel.

According to the aspect, when a unit shaping body is assumed to be formed in an external voxel, in a case where the unit shaping body constitutes the projection of the irregularities of the surface of the solid object, the second unit shaping body is formed in the external voxel. For this reason, when compared with a case where the unit shaping body is not formed in the external voxel, it is possible to smoothen a color change in the projection of the irregularities of the surface of the solid object and thus to shape the solid object having a smooth surface with less roughness.

According to still another aspect of the invention, there is provided a control method for a solid object shaping apparatus which includes a head unit that ejects a liquid containing a colorant component; and a curing unit that cures the liquid ejected from the head unit so as to form a dot, and shapes a solid object by using a dot, the method including controlling the head unit so that a unit shaping body formed by a single dot or a plurality of dots is formed in a voxel, and a solid object is shaped by using the plurality of unit shaping bodies, when supplied with designation data which is data regarding a model indicating a shape and a color of the solid object to be shaped as a set of the voxels each having a predetermined rectangular parallelepiped shape and which designates the single dot or the plurality of dots to be formed in the voxel, in which the plurality of unit shaping bodies constituting the solid object include a first unit shaping body having an amount of colorant components required to represent the color indicated by the model; and a second unit shaping body having an amount of the colorant components which is smaller than the amount required to represent the color indicated by the model. In the second unit shaping body, two or more faces of six faces forming a surface of the second unit shaping body correspond to a surface of the solid object, and a proportion of an inner portion of the model of the second unit shaping body to the entire second unit shaping body is equal to or less than a first reference value.

According to the aspect of the invention, a projection of irregularities of a surface of the solid object can be formed by using the second unit shaping body having a color lighter than a color indicated by the model. For this reason, it is possible to lighten a color of the projection of the irregularities of the surface of the solid object and thus to shape the solid object having a smooth surface with less roughness.

According to still another aspect of the invention, there is provided a control program for a solid object shaping apparatus which includes a head unit that ejects a liquid containing a colorant component; a curing unit that cures the liquid ejected from the head unit so as to form a dot; and a computer, and shapes a solid object by using a dot, the program causing the computer to function as a control portion that controls the head unit so that a unit shaping body formed by a single dot or a plurality of dots is formed in a voxel, and a solid object is shaped by using the plurality of unit shaping bodies, when supplied with designation data which is data regarding a model indicating a shape and a color of the solid object to be shaped as a set of the voxels each having a predetermined rectangular parallelepiped shape and which designates the single dot or the plurality of dots to be formed in the voxel, in which the plurality of unit shaping bodies constituting the solid object include a first unit shaping body having an amount of colorant components required to represent the color indicated by the model; and a second unit shaping body having an amount of the colorant components which is smaller than the amount required to represent the color indicated by the model. In the second unit shaping body, two or more faces of six faces forming a surface of the second unit shaping body correspond to a surface of the solid object, and a proportion of an inner portion of the model of the second unit shaping body to the entire the second unit shaping body is equal to or less than a first reference value.

According to of the aspect of the invention, a projection of irregularities of a surface of the solid object can be formed by using the second unit shaping body having a color lighter than a color indicated by the model. For this reason, it is possible to lighten a color of the projection of the irregularities of the surface of the solid object and thus to shape the solid object having a smooth surface with less roughness.

BRIEF DESCRIPTION OF THE DRAWINGS

The invention will be described with reference to the accompanying drawings, wherein like numbers reference like elements.

FIG. 17 is a diagram for explaining a relationship between the filling ratio and the type of block.

FIGS. 21A to 21F are diagrams for explaining shaping of a solid object in a solid object shaping system related to Modification Example 8.

DESCRIPTION OF EXEMPLARY EMBODIMENTS

Hereinafter, an embodiment of the invention will be described with reference to the drawings. However, a dimension and a scale of each part are different from actual ones as appropriate in each drawing. The embodiment described below is a preferred specific example of the invention and is thus added with technically preferred various limitations, but the scope of the invention is not limited to such an embodiment unless description for limiting the invention is made in the following description.

A. EMBODIMENT

In the present embodiment, as a solid object shaping apparatus, a description will be made by exemplifying an ink jet type solid object shaping apparatus which ejects curable ink (an example of a "liquid") such as resin ink containing resin emulsion or ultraviolet curable ink so as to shape a solid object Obj.

1. Configuration of Solid Object Shaping System

Hereinafter, with reference to FIGS. 1 to 9, a description will be made of a solid object shaping system 100 including a solid object shaping apparatus 1 according to the present embodiment.

Figure 1:
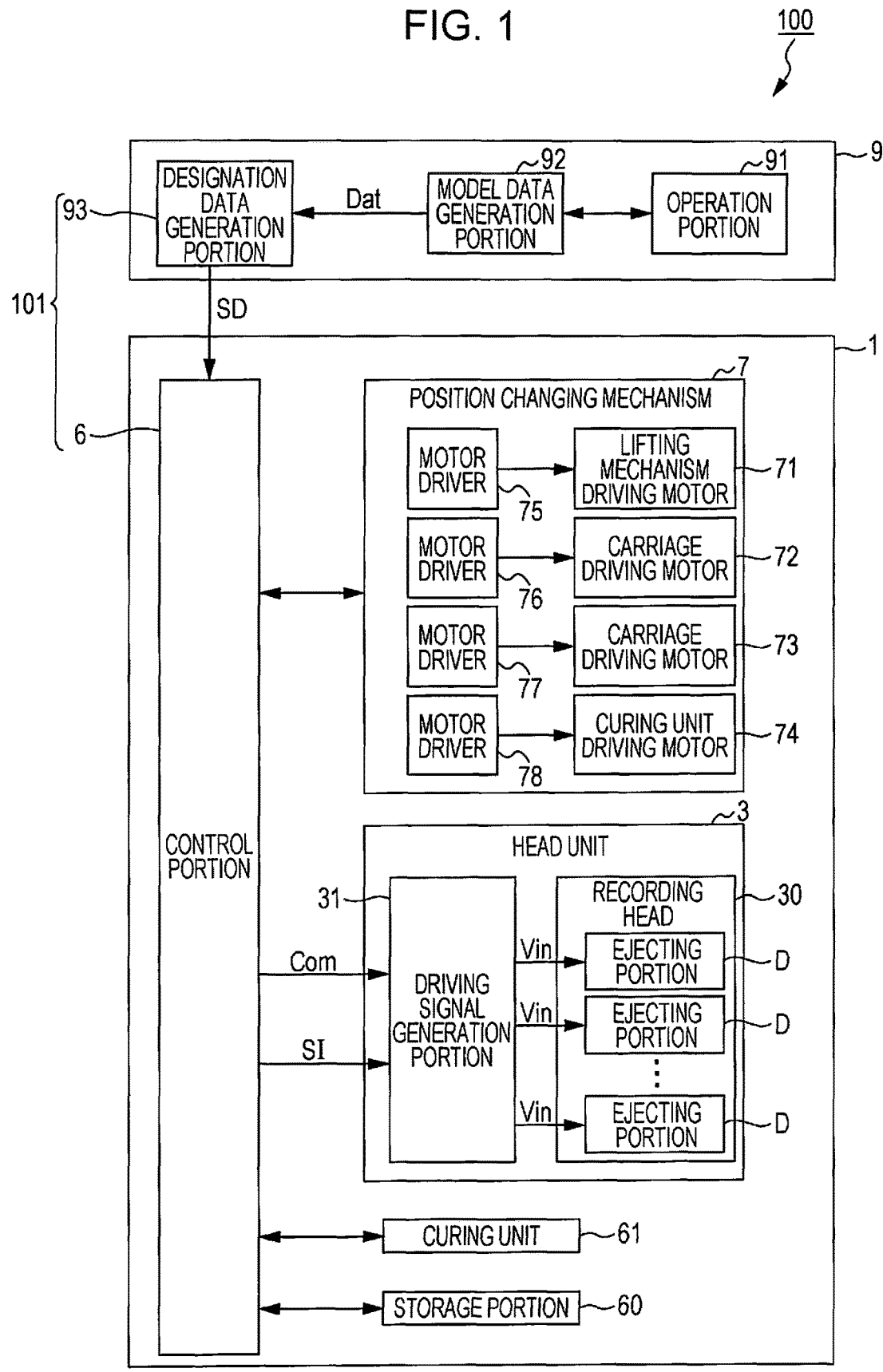
FIG. 1 is a block diagram illustrating a configuration of a solid object shaping system according to an embodiment of the invention.

FIG. 1 is a functional block diagram illustrating a configuration of the solid object shaping system 100.

As illustrated in FIG. 1, the solid object shaping system 100 includes the solid object shaping apparatus 1 and a host computer 9. The solid object shaping apparatus 1 performs a shaping process of ejecting ink, forming a layer-like shaping body LY with a predetermined thickness ΔZ by using dots formed by the ejected ink, and shaping a solid object Obj by laminating the shaping body LY. The host computer 9 performs a data generation process of generating designation data SD designating a shape and a color of each of a plurality of shaping bodies LY constituting the solid object Obj shaped by the solid object shaping apparatus 1.

1.1 Host Apparatus

As illustrated in FIG. 1, the host computer 9 includes a CPU (not illustrated) which controls operations of respective portions of the host computer 9; a display portion (not illustrated) such as a display; an operation portion 91 such as a keyboard or a mouse; an information storage portion (not illustrated) which stores a control program for the host computer 9, a driver program for the solid object shaping apparatus 1, and application programs such as computer aided design (CAD) software; a model data generation portion 92 which generates model data Dat; and a designation data generation portion 93 which generates the data generation process of generating the designation data SD on the basis of the model data Dat.

Here, the model data Dat is data indicating a shape and a color of a model which represents the solid object Obj which is to be shaped by the solid object shaping apparatus 1, and designates a shape and a color of the solid object Obj. In the following description, it is assumed that a color of the solid object Obj includes a method of giving a plurality of colors in a case where the plurality of colors are given to the solid object Obj, that is, shapes, characters, and other images represented by the plurality of colors given to the solid object Obj.

The model data generation portion 92 is a functional block which is realized by the CPU of the host computer 9 executing the application programs stored in the information storage portion. The model data generation portion 92 is, for example, a CAD application, and generates the model data Dat indicating a model for representing a shape and a color of the solid object Obj on the basis of information or the like which is input by a user of the solid object shaping system 100 operating the operation portion 91.

In the present embodiment, it is assumed that the model data Dat designates an outer shape of the solid object Obj. In other words, it is assumed that the model data Dat designates the shape of a hollow object when the solid object Obj is assumed to be the hollow object, that is, a shape of an outer surface SF which is a contour of a model of the solid object Obj. For example, in a case where the solid object Obj is a sphere, the model data Dat designates a shape of a spherical surface which is a contour of the sphere.

However, the invention is not limited to such an aspect, and the model data Dat may include at least information which can specify a shape of an outer surface SF of a model of the solid object Obj. For example, the model data Dat may be data for designating a more inner shape than the outer surface SF of the model of the solid object Obj or a material of the solid object Obj in addition to a shape of the outer surface SF of the model of the solid object Obj and a color of the solid object Obj.

The model data Dat may have a data format such as Additive Manufacturing File Format (AMF) or Standard Triangulated Language (STL).

The designation data generation portion 93 is a functional block which is realized by the CPU of the host computer 9 executing the driver program for the solid object shaping apparatus 1 stored in the information storage portion. The designation data generation portion 93 performs the data generation process of generating the designation data SD for designating a shape and a color of the shaping body LY formed by the solid object shaping apparatus 1 on the basis of the model data Dat generated by the model data generation portion 92.

In the following description, it is assumed that the solid object Obj is shaped by laminating Q layer-like shaping bodies LY (where Q is a natural number satisfying Q≥2). A process in which the solid object shaping apparatus 1 forms the shaping body LY is referred to as a laminate process. In other words, the shaping process in which the solid object shaping apparatus 1 shapes the solid object Obj includes Q laminate processes. Hereinafter, the shaping body LY formed in the q-th laminate process among the Q laminate processes included in the shaping process is referred to as a shaping body LY[q], and the designation data SD for designating a shape and a color of the shaping body LY[q] is referred to as designation data SD[q] (where q is a natural number satisfying 1≤q≤Q).

FIGS. 2A to 2E are diagrams for explaining a relationship between the shape of an outer surface SF of a model of the solid object Obj designated by the model data Dat, and the shaping body LY formed by using the designation data SD.

Figure 2A:
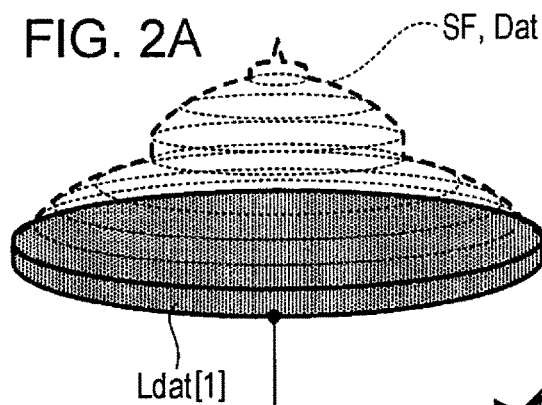
FIGS. 2A to 2E are diagrams for explaining shaping of a solid object in the solid object shaping system.
Figure 2B:
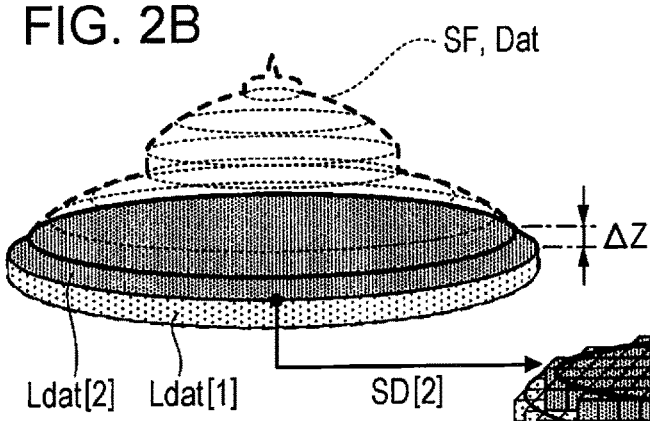
Figure 2B:
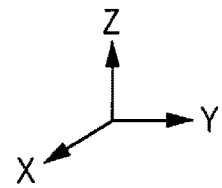

As illustrated in FIGS. 2A and 2B, in order to generate designation data SD[1] to SD[Q] designating shapes and colors of shaping bodies LY[1] to LY[Q] each having a predetermined thickness ΔZ, the designation data generation portion 93 first slices the outer surface SF of the model having a three-dimensional shape indicated by the model data Dat for each predetermined thickness ΔZ so as to generate sectional model data Ldat[1] to Ldat[Q] corresponding to the shaping bodies LY[1] to LY[Q] with a one-to-one relationship. Here, the section model data Ldat is data indicating a shape and a color of a sectional body obtained by slicing the model having a three-dimensional shape indicated by the model data Dat. However, the section model data Ldat may include data indicating a shape and a color of a section obtained by slicing the model having a three-dimensional shape indicated by the model data Dat. FIG. 2A exemplifies the section model data Ldat[1] corresponding to the shaping body LY[1] formed in the first laminate process, and FIG. 2B exemplifies the section model data Ldat[2] corresponding to the shaping body LY[2] formed in the second laminate process.

Next, in order to form the shaping body LY[q] corresponding to a shape and a color indicated by the section model data Ldat[q], the designation data generation portion 93 determines the arrangement of dots to be formed by the solid object shaping apparatus 1 and outputs a determination result as the designation data SD. More specifically, the designation data generation portion 93 generates shaping body data FD[q] on the basis of the section model data Ldat[q], and generates the designation data SD[q] on the basis of the shaping body data FD[q].

Here, the shaping body data FD[q] is data representing, as a set of voxels Vx, the shape and the color of the sectional body of the model of the solid object Obj indicated by the section model data Ldat[q], by subdividing the shape and the color of the sectional body of the model of the solid object Obj indicated by the section model data Ldat[q] in a lattice form.

The designation data SD[q] is data designating dots which are to be formed in each of a plurality of voxels Vx. In other words, the designation data SD is data designating a color and a size of a dot which is to be formed in order to shape the solid object Obj. For example, the designation data SD may designate a color of a dot depending on the type of ink used to form the dot. The type of ink will be described later.

The voxel Vx is a rectangular parallelepiped which has a predetermined size, a predetermined thickness ΔZ, and a predetermined volume. In the present specification, the rectangular parallelepiped will be described as a concept including a cube.

In the present embodiment, a volume and a size of the voxel Vx are determined in accordance with a size of a dot which can be formed by the solid object shaping apparatus 1. Hereinafter, a voxel Vx corresponding to the shaping body LY[q] is referred to as a voxel Vxq in some cases.

In addition, hereinafter, a constituent element of the shaping body LY constituting the solid object Obj is referred to as a block BL (an example of a "unit shaping body"), the constituent element being formed to correspond to a single voxel Vx and having a predetermined volume and a predetermined thickness ΔZ. As will be described later in detail, the block BL is constituted of one or a plurality of dots. In other words, the block BL is one or a plurality of dots which are formed to fill a single voxel Vx. In other words, in the present embodiment, the designation data SD designates that one or a plurality of dots are to be formed in each voxel Vx.

As described above, the solid object shaping system 100 shapes the solid object Obj as a set of the rectangular parallelepiped blocks BL by subdividing a model of the solid object Obj indicated by the model data Dat generated by the model data generation portion 92 in a lattice form. For this reason, precisely (speaking from the microscopic viewpoint), a shape of the solid object Obj is different from a shape of the model of the solid object Obj indicated by the model data Dat. In other words, the outer surface SF of the model of the solid object Obj indicated by the model data Dat is different from a shape of a surface of the solid object Obj which is actually shaped by the solid object shaping apparatus 1 (refer to FIGS. 18A and 18B which will be described later). For example, even if a shape of the outer surface SF of the model indicated by the model data Dat is a smooth curve, a surface of the solid object Obj shaped by the solid object shaping apparatus 1 may have an irregular shape from the microscopic viewpoint.

Figure 2C:
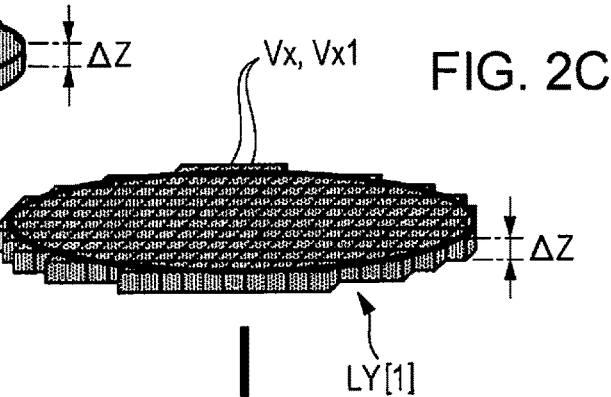
Figure 2D:
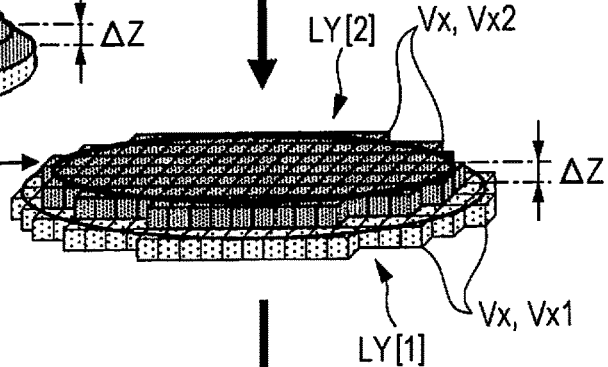

As illustrated in FIGS. 2C and 2D, if the designation data SD[q] is supplied from the designation data generation portion 93, the solid object shaping apparatus 1 performs the laminate process of forming the shaping body LY[q]. FIG. 2C exemplifies a case where the first shaping body LY[1] is formed on a shaping platform 45 (refer to FIG. 3) on the basis of designation data SD[1] generated from the section model data Ldat[1], and FIG. 2D exemplifies a case where the second shaping body LY[2] is formed on the first shaping body LY[1] on the basis of designation data SD[2] generated from the section model data Ldat[2].

Figure 2E:
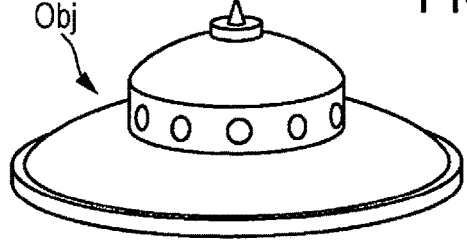

The solid object shaping apparatus 1 sequentially laminates the shaping bodies LY[1] to LY[Q] corresponding to the designation data SD[1] to SD[Q], so as to shape the solid object Obj illustrated in FIG. 2E.

As described above, the model data Dat according to the present embodiment designates a shape (a shape of a contour) of the outer surface SF of the model of the solid object Obj. For this reason, in a case where the solid object Obj having the shape indicated by the model data Dat is faithfully shaped, a shape of the solid object Obj is a hollow shape of only a contour without thickness. However, in a case where the solid object Obj is shaped, a more inner shape than the outer surface SF is preferably determined in consideration of the intensity or the like of the solid object Obj. Specifically, in a case where the solid object Obj is shaped, a part of a more inner region of the solid object Obj than the outer surface SF or the entire region preferably has a solid structure.

For this reason, as illustrated in FIGS. 2A to 2E, the designation data generation portion 93 according to the present embodiment generates the section model data Ldat which causes a part of a more inner region than the outer surface SF or the entire region to have a solid structure regardless of a shape designated by the model data Dat is a hollow shape.

Hereinafter, in the data generation process, a process of complementing a hollow portion of a shape of a model indicated by the model data Dat and generating the section model data Ldat which causes a shape of a part of or the entire hollow portion to have a solid structure, is referred to as a shape complementing process. The shape complementing process, and a more inner structure than the outer surface SF designated by the section model data Ldat will be described later in detail.

Meanwhile, in the example illustrated in FIGS. 2A to 2E, a voxel Vx1 constituting the shaping body LY[1] formed in the first laminate process is present under (−Z direction) a voxel Vx2 constituting the shaping body LY[2] formed in the second laminate process. However, the voxel Vx1 may not be present under the voxel Vx2 depending on a shape of the solid object Obj. In this case, even if a dot is formed in the voxel Vx2, there is a probability that the dot may fall to the lower side. Therefore, in a case of "q≥2", in order to form the voxel Vxq in which a dot constituting the shaping body LY[q] is to be inherently formed, a support for supporting the dot formed in the voxel Vxq is required to be provided at least at a part of the lower side of the voxel Vxq.

Therefore, in the present embodiment, the section model data Ldat includes data defining a shape of the support which is necessary during shaping of the solid object Obj in addition to the data regarding the solid object Obj. In other words, in the present embodiment, the shaping body LY[q] includes a portion of the solid object Obj which is to be formed in a q-th laminate process and a portion of the support which is to be formed in the q-th laminate process. In other words, the designation data SD[q] includes data which indicates a shape and a color of the portion of the solid object Obj formed as the shaping body LY[q], as a set of voxels Vxq, and data which indicates a shape of the portion of the support formed as the shaping body LY[q], as a set of voxels Vxq.

The designation data generation portion 93 according to the present embodiment determines whether or not the support is required to be provided in order to form the voxel Vxq on the basis of the model data Dat. If a result of the determination is affirmative, the designation data generation portion 93 generates the section model data Ldat which causes both the solid object Obj and the support to be provided.

The support is preferably made of a material which is easily removed after the solid object Obj is shaped, for example, water-soluble ink, or ink having a melting point lower than that of ink used to shape the solid object Obj.

1.2 Solid Object Shaping Apparatus

Figure 3:
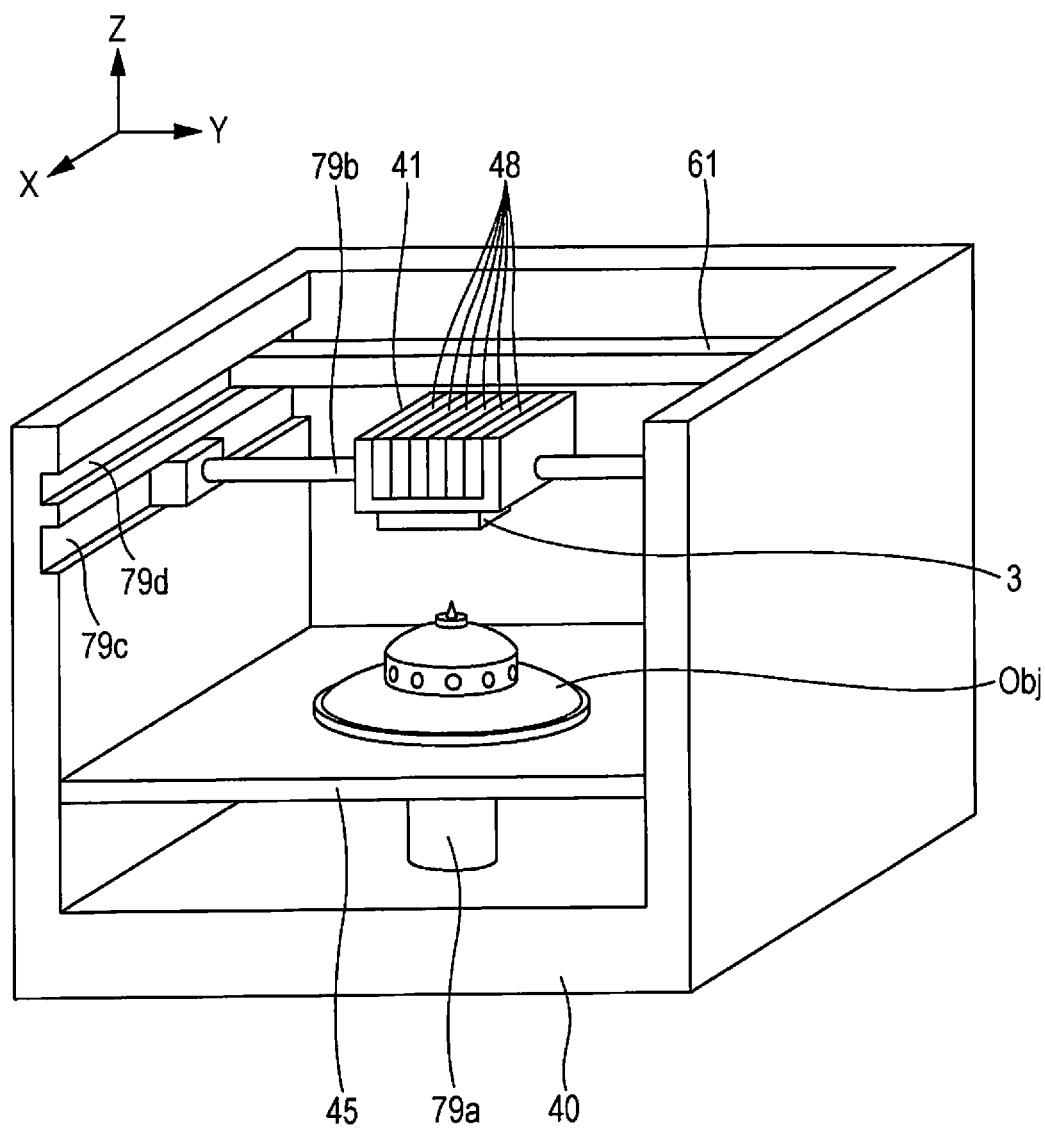
FIG. 3 is a schematic sectional view of a solid object shaping apparatus.

Next, the solid object shaping apparatus 1 will be described with reference to FIGS. 1 and 3. FIG. 3 is a perspective view illustrating a schematic structure of the solid object shaping apparatus 1.

As illustrated in FIGS. 1 and 3, the solid object shaping apparatus 1 includes a casing 40; a shaping platform 45; a control portion 6 (referred to as a "shaping control portion" in some cases) which controls an operation of each unit of the solid object shaping apparatus 1; a head unit 3 provided with a recording head 30 including an ejecting portion D which ejects ink toward the shaping platform 45; a curing unit 61 which cures the ink ejected on the shaping platform 45; six ink cartridges 48 which store ink; a carriage 41 in which the head unit 3 and the ink cartridges 48 are mounted; a position changing mechanism 7 which changes positions of the head unit 3, the shaping platform 45, and the curing unit 61 with respect to the casing 40; and a storage portion 60 which stores the control program for the solid object shaping apparatus 1 and other various information.

The control portion 6 and the designation data generation portion 93 function as a system controller 101 which controls an operation of each portion of the solid object shaping system 100.

The curing unit 61 is a constituent element which cures ink ejected on the shaping platform 45, and may be, for example, a light source which irradiates ultraviolet curable ink with ultraviolet rays, or a heater which heats resin ink. In a case where the curing unit 61 is an ultraviolet light source, the curing unit 61 may be provided, for example, over (+Z direction) of the shaping platform 45. On the other hand, in a case where the curing unit 61 is a superheater, for example, the curing unit 61 may be built into the shaping platform 45 or may be provided under the shaping platform 45. Hereinafter, a description will be made assuming that the curing unit 61 is an ultraviolet light source, and the curing unit 61 is located in the +Z direction of the shaping platform 45.

The six ink cartridges 48 are provided so as to correspond to a total of six types of ink including five color types of shaping ink for shaping the solid object Obj and support ink for forming a support with a one-to-one relationship. Each of the ink cartridges 48 stores the type of ink corresponding to the ink cartridge 48.

The five color types of shaping ink for shaping the solid object Obj include chromatic ink containing a chromatic colorant component, achromatic ink containing an achromatic colorant component, and clear (CL) ink in which the content of a colorant component per unit weight or per unit volume is smaller than that of the chromatic ink and the achromatic ink.

In the present embodiment, three color types of ink including cyan (CY) ink, magenta (MG) ink, and yellow (YL) ink are employed as the chromatic ink.

In the present embodiment, white (WT) ink is employed as the achromatic ink. The white ink according to the present embodiment is ink which reflects a predetermined proportion or higher of applied light in a case where the light having a wavelength included in a wavelength region (roughly, 400 nm to 700 nm) of visible light is applied to the white ink. The phrase "reflecting light of a predetermined proportion or higher" is the same meaning as "absorbing or transmitting light of below the predetermined proportion", and corresponds to, for example, a case where a proportion of an amount of light reflected from the white ink to an amount of light applied to the white ink is equal to or higher than the predetermined proportion. In the present embodiment, the "predetermined proportion" may be, for example, any proportion of 30% or higher and 100% or lower, preferably any proportion of 50% or higher, and more preferably any proportion of 80% or higher.

In the present embodiment, the clear ink has the content of a colorant component lower than that of the chromatic ink and the achromatic ink and is thus highly transparent.

Each of the ink cartridges 48 may be provided at other locations of the solid object shaping apparatus 1 instead of being mounted in the carriage 41.

As illustrated in FIGS. 1 and 3, the position changing mechanism 7 includes a lifting mechanism driving motor 71 for driving a shaping platform lifting mechanism 79a which moves up and down the shaping platform 45 in the +Z direction and the −Z direction (hereinafter, the +Z direction and the −Z direction are collectively referred to as a "Z axis direction" in some cases); a carriage driving motor 72 for moving the carriage 41 along a guide 79b in the +Y direction and the −Y direction (hereinafter, the +Y direction and the −Y direction are collectively referred to as a "Y axis direction" in some cases); a carriage driving motor 73 for moving the carriage 41 along a guide 79c in the +X direction and the −X direction (hereinafter, the +X direction and the −X direction are collectively referred to as a "X axis direction" in some cases); and a curing unit driving motor 74 for moving the curing unit 61 along a guide 79d in the +X direction and the −X direction.

The position changing mechanism 7 also includes a motor driver 75 which drives the lifting mechanism driving motor 71; a motor driver 76 which drives the carriage driving motor 72; a motor driver 77 which drives the carriage driving motor 73; and a motor driver 78 which drives the curing unit driving motor 74.

The storage portion 60 includes an electrically erasable programmable read-only memory (EEPROM) which is a kind of nonvolatile memory storing the designation data SD supplied from the host computer 9; a random access memory (RAM) which temporarily stores data required to perform various processes such as the shaping process of shaping the solid object Obj or in which the control program for controlling each portion of the solid object shaping apparatus 1 is temporarily developed in order to perform various processes such as the shaping process; and a PROM which is a kind of nonvolatile memory storing the control program.

The control portion 6 is configured to include a central processing unit (CPU) or a field-programmable gate array (FPGA), and controls an operation of each portion of the solid object shaping apparatus 1 when the CPU or the like operates according to the control program stored in the storage portion 60.

In a case where the designation data SD is supplied from the host computer 9, the control portion 6 controls operations of the head unit 3 and the position changing mechanism 7, and thus controls execution of the shaping process of shaping the solid object Obj corresponding to the model data Dat on the shaping platform 45.

Specifically, first, the control portion 6 stores the designation data SD supplied from the host computer 9 in the storage portion 60. Next, the control portion 6 controls an operation of the head unit 3 on the basis of various data such as the designation data SD stored in the storage portion 60, generates and outputs a driving waveform signal Com and a waveform designation signal SI for driving the ejecting portion D, and outputs the generated signals. The control portion 6 generates various signals for controlling operations of the motor drivers 75 to 78 on the basis of various data such as the designation data SD stored in the storage portion 60, and outputs the generated signals.

The driving waveform signal Com is an analog signal. For this reason, the control portion 6, which includes a DA conversion circuit (not illustrated), converts digital driving waveform signals generated by the CPU and the like included in the control portion 6 into analog driving waveform signals Com and outputs the converted signals.

As mentioned above, the control portion 6 controls a position of the head unit 3 relative to the shaping platform 45 via control of the motor drivers 75, 76 and 77, and controls a position of the curing unit 61 relative to the shaping platform 45 via control of the motor drivers 75 and 78. The control portion 6 controls whether or not ink is ejected from the ejecting portion D, an amount of ink to be ejected, ink ejection timing, and the like via control of the head unit 3.

Consequently, the control portion 6 controls execution of the laminate process in which dots are formed on the shaping platform 45 while adjusting sizes and arrangement of the dots formed by ink ejected on the shaping platform 45, and the shaping body LY is formed by curing the dots formed on the shaping platform 45. The control portion 6 controls execution of the shaping process in which new shaping bodies LY are laminated on the shaping body LY which has already been formed by repeatedly performing the laminate process, and thus the solid object Obj corresponding to the model data Dat is formed.

As illustrated in FIG. 1, the head unit 3 includes the recording head 30 provided with M ejecting portions D, and a driving signal generation portion 31 which generates a driving signal Vin for driving the ejecting portion D (where M is a natural number of 1 or greater).

Hereinafter, in order to differentiate the M ejecting portions D provided in the recording head 30 from each other, ejecting portions D are sequentially referred to as a first stage ejecting portion D, a second stage ejecting portion D, . . . , and an M-th stage ejecting portion D in some cases. In addition, hereinafter, an m-th ejecting portion D of the M ejecting portions D provided in the recording head 30 is referred to as an ejecting portion D[m] in some cases (where m is a natural number satisfying 1≤m≤M). Hereinafter, a driving signal Vin for driving the ejecting portion D[m] among the driving signals Vin generated by the driving signal generation portion 31 is referred to as a driving signal Vin[m] in some cases.

Details of the driving signal generation portion 31 will be described later.

1.3 Recording Head

Next, with reference to FIGS. 4 to 6, a description will be made of the recording head 30 and the ejecting portion D provided in the recording head 30.

Figure 4:
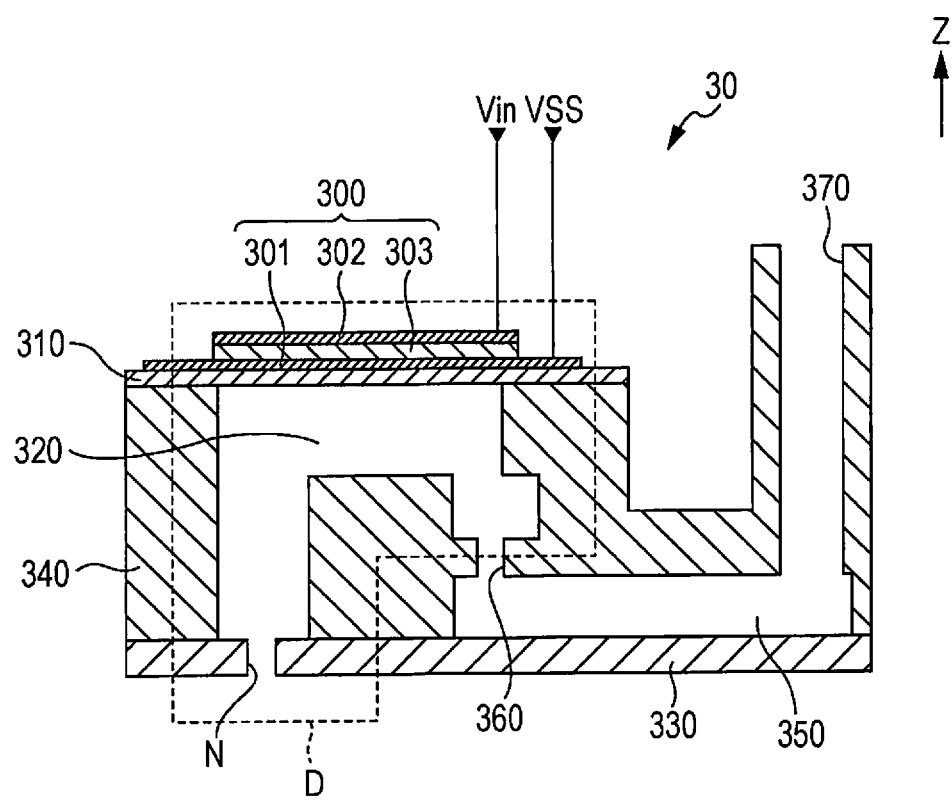
FIG. 4 is a schematic sectional view of a recording head.

FIG. 4 illustrates an example of a schematic partial sectional view of the recording head 30. For convenience of illustration, in the recording head 30, FIG. 4 illustrates one ejecting portion D of the M ejecting portions D included in the recording head 30, a reservoir 350 which communicates with the one ejecting portion D via an ink supply port 360, and an ink intake port 370 for supplying ink from the ink cartridge 48 to the reservoir 350.

As illustrated in FIG. 4, the ejecting portion D includes a piezoelectric element 300, a cavity 320 filled with ink, a nozzle N which communicates with the cavity 320, and a vibration plate 310. In the ejecting portion D, the piezoelectric element 300 is driven by the driving signal Vin, and thus the ink in the cavity 320 is ejected from the nozzle N. The cavity 320 is a space partitioned by a cavity plate 340 which is molded in a predetermined shape having a recess, and a nozzle plate 330 in which the nozzle N is formed, and the vibration plate 310. The cavity 320 communicates with the reservoir 350 via the ink supply port 360. The reservoir 350 communicates with one ink cartridge 48 via the ink intake port 370.

In the present embodiment, as the piezoelectric element 300, for example, a unimorph (monomorph) type piezoelectric element as illustrated in FIG. 4 is used. The piezoelectric element 300 is not limited to the unimorph type piezoelectric element, and may be a piezoelectric element which can eject a liquid such as ink through deformation of the piezoelectric element 300, such as a bimorph type or laminate type piezoelectric element.

The piezoelectric element 300 includes a lower electrode 301, an upper electrode 302, and a piezoelectric body 303 provided between the lower electrode 301 and the upper electrode 302. If a potential of the lower electrode 301 is set to a predetermined reference potential VSS, and the driving signal Vin is supplied to the upper electrode 302 so that a voltage is applied between the lower electrode 301 and the upper electrode 302, the piezoelectric element 300 is bent (displaced) in a vertical direction in the figure according to the applied voltage, and thus the piezoelectric element 300 vibrates.

The vibration plate 310 is provided on an upper opening of the cavity plate 340, and the lower electrode 301 is joined to the vibration plate 310. For this reason, if the piezoelectric element 300 vibrates according to the driving signal Vin, the vibration plate 310 also vibrates. A volume of the cavity 320 (pressure in the cavity 320) is changed due to the vibration of the vibration plate 310, and thus the ink filling the cavity 320 is ejected from the nozzle N. If an amount of the ink in the cavity 320 is reduced due to the ejection of the ink, ink is supplied from the reservoir 350. In addition, ink is supplied to the reservoir 350 from the ink cartridge 48 via the ink intake port 370.

Figure 5A:
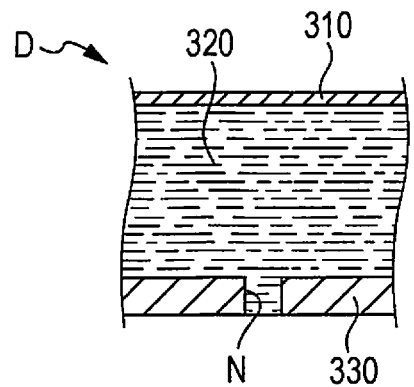
FIGS. 5A to 5C are diagrams for explaining an operation of an ejecting portion when a driving signal is supplied.
Figure 5B:
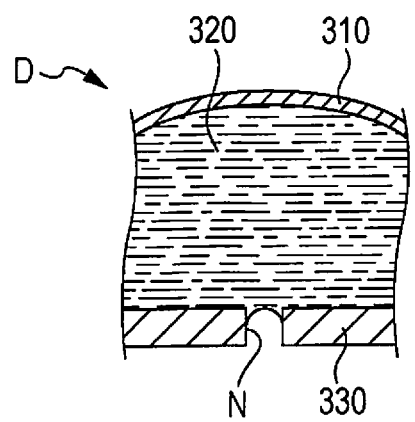
Figure 5C:
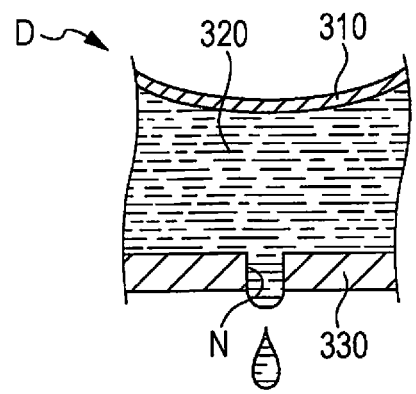

FIGS. 5A to 5C are diagrams for explaining an operation of ejecting ink from the ejecting portion D. In a state illustrated in FIG. 5A, if the driving signal Vin is supplied to the piezoelectric element 300 of the ejecting portion D from the driving signal generation portion 31, distortion corresponding to an electric field applied between the electrodes occurs in the piezoelectric element 300, and thus the vibration plate 310 of the ejecting portion D is bent upward in the figure. Consequently, the volume of the cavity 320 of the ejecting portion D increases as illustrated in FIG. 5B compared with the initial state illustrated in FIG. 5A. In a state illustrated in FIG. 5B, if a potential indicated by the driving signal Vin is changed, the vibration plate 310 is restored by an elastic restoring force thereof so as to be moved downward in the figure exceeding the position of the vibration plate 310 in the initial state, and thus the volume of the cavity 320 rapidly decreases as illustrated in FIG. 5C. At this time, some of the ink filling the cavity 320 is ejected as ink droplets from the nozzle N which Communicates with the cavity 320 due to compression pressure occurring in the cavity 320.

Figure 6:
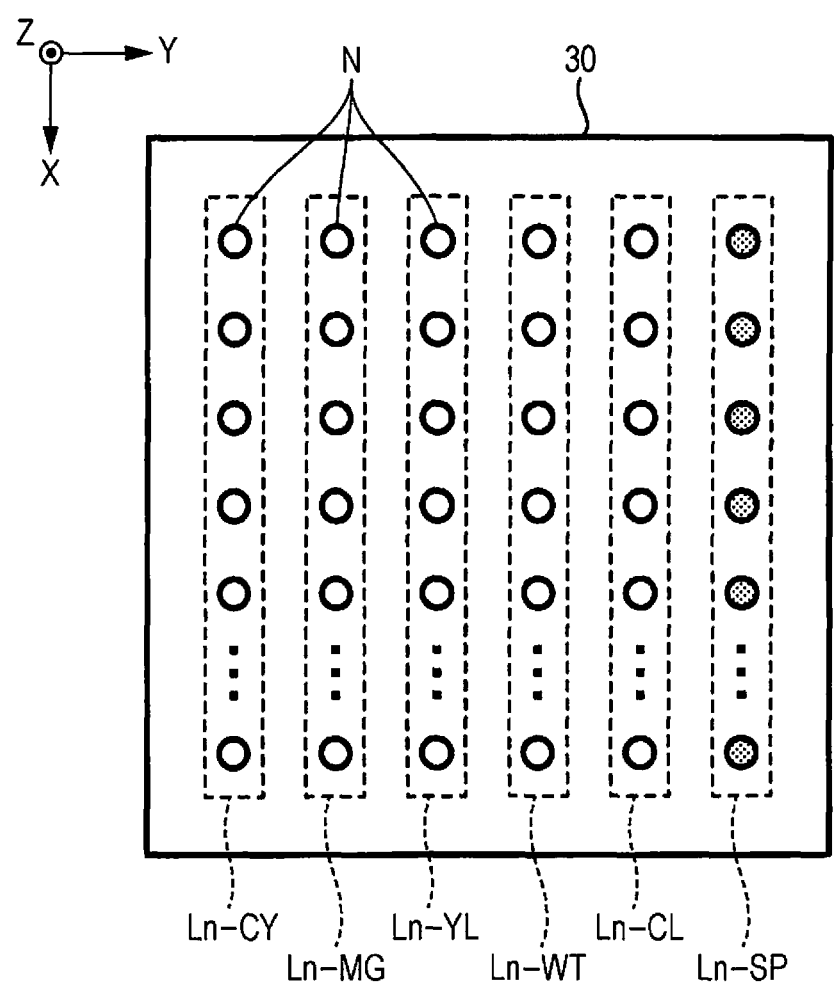
FIG. 6 is a plan view illustrating an arrangement example of nozzles in the recording head.

FIG. 6 is a diagram for explaining an example of arrangement of M nozzles N provided on the recording head 30 in a plan view of the solid object shaping apparatus 1 from the +Z direction or −Z direction.

As illustrated in FIG. 6, the recording head 30 is provided with six nozzle strings Ln including a nozzle string Ln-CY formed of a plurality of nozzles N, a nozzle string Ln-MG formed of a plurality of nozzles N, a nozzle string Ln-YL formed of a plurality of nozzles N, a nozzle string Ln-WT formed of a plurality of nozzles N, a nozzle string Ln-CL formed of a plurality of nozzles N, and a nozzle string Ln-SP formed of a plurality of nozzles N.

Here, the nozzles N included in the nozzle string Ln-CY are nozzles N provided in the ejecting portion D which ejects cyan (CY) ink; the nozzles N included in the nozzle string Ln-MG are nozzles N provided in the ejecting portion D which ejects magenta (MG) ink; the nozzles N included in the nozzle string Ln-YL are nozzles N provided in the ejecting portion D which ejects yellow (YL) ink; the nozzles N included in the nozzle string Ln-WT are nozzles N provided in the ejecting portion D which ejects white (WT) ink; the nozzles N included in the nozzle string Ln-CL are nozzles N provided in the ejecting portion D which ejects clear (CL) ink; and the nozzles N included in the nozzle string Ln-SP are nozzles N provided in the ejecting portion D which ejects support ink.

In the present embodiment, as illustrated in FIG. 6, a case is exemplified in which the plurality of nozzles N included in each nozzle string Ln are disposed to be arranged in a column in the X axis direction. However, for example, some (for example, even-numbered nozzles N) of the plurality of nozzles N included in each nozzle string Ln and the other nozzles N (for example, odd-numbered nozzles N) may be different from each other in positions in the Y axis direction, that is, may be disposed in a so-called zigzag shape.

In each nozzle string Ln, an interval (pitch) between the nozzles N may be set as appropriate according to printing resolution (dot per inch: dpi).

1.4 Driving Signal Generation Portion

Next, with reference to FIGS. 7 to 9, a description will be made of a configuration and an operation of the driving signal generation portion 31.

Figure 7:
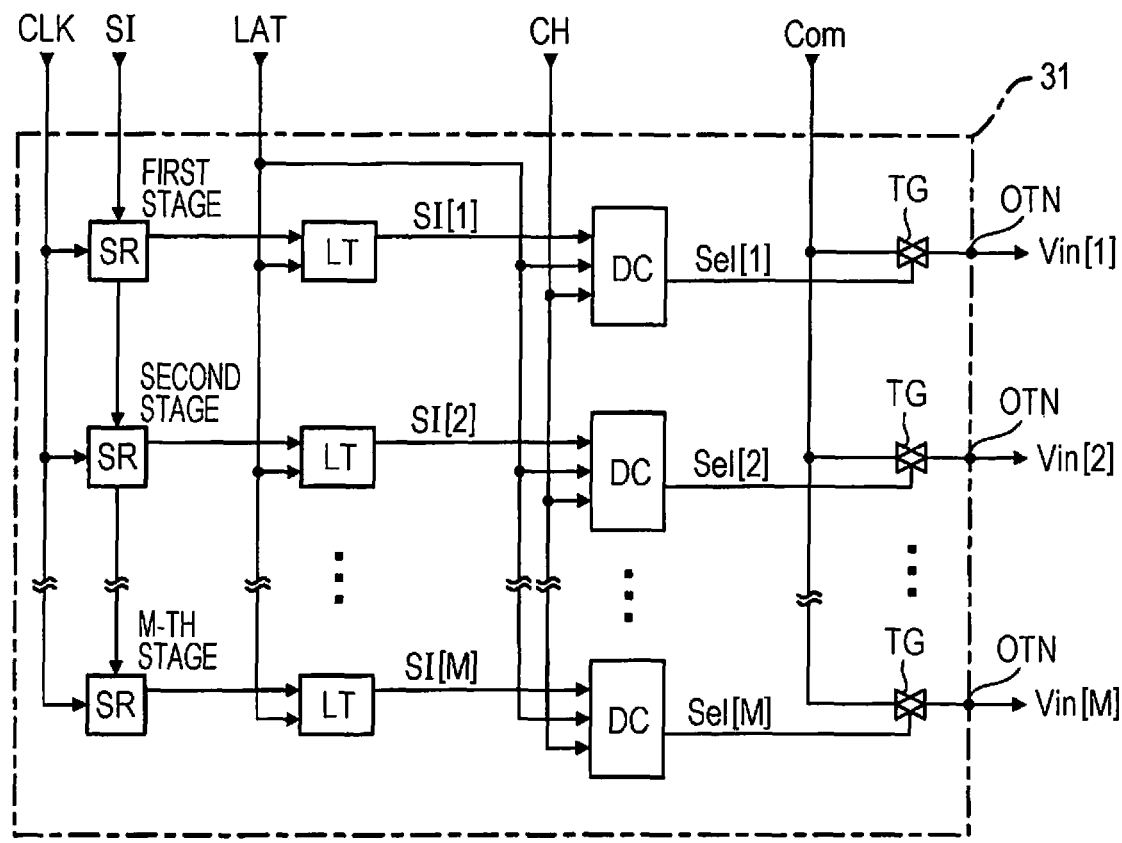
FIG. 7 is a block diagram illustrating a configuration of a driving signal generation portion.

FIG. 7 is a block diagram illustrating a configuration of the driving signal generation portion 31.

As illustrated in FIG. 7, the driving signal generation portion 31 is provided with M sets each of which includes a shift register SR, a latch circuit LT, a decoder DC, and a transmission gate TG, so as to respectively correspond to the M ejecting portions D provided in the recording head 30. Hereinafter, the respective elements constituting in the M sets included in the driving signal generation portion 31 and the recording head 30 are sequentially referred to as first stage elements, second stage elements, . . . , and M-th stage elements from the top in the figure.

A clock signal CLK, a waveform designation signal SI, a latch signal LAT, a change signal CH, and a driving waveform signal Com are supplied to the control portion 6 from the driving signal generation portion 31.

The waveform designation signal SI is a digital signal which is defined on the basis of the designation data SD and designates whether or not ink is to be ejected from the ejecting portion D and an amount of ink to be ejected from the ejecting portion D, and includes waveform designation signals SI[1] to SI[M].

Among the signals, the waveform designation signal SI[m] defines whether or not ink is to be ejected from the ejecting portion D[m], and an amount of ink to be ejected, in two bits including a high-order bit b1 and a low-order bit b2. Specifically, the waveform designation signal SI[m] designates any one of ejection of ink in an amount corresponding to a large dot, ejection of ink in an amount corresponding to a medium dot, ejection of ink in an amount corresponding to a small dot, and non-ejection of ink, for the ejecting portion D[m].

Each of the shift registers SR temporarily holds a 2-bit waveform designation signal SI[m] corresponding to each stage among the waveform designation signals SI (SI[1] to SI[M]). Specifically, the M shift registers SR including the first, second, . . . and M-th stage shift registers SR which respectively correspond to the M ejecting portions D[1] to D[M] are connected to each other in the vertical direction. In addition, the waveform designation signals SI which are serially supplied are transmitted to the subsequent stages according to the clock signal CLK. In a case where the waveform designation signals SI have been transmitted to all of the M shift registers SR, each of the M shift registers SR holds the 2-bit waveform designation signal SI[m] corresponding thereto among the waveform designation signals SI.

The M latch circuits LT simultaneously latch the 2-bit waveform designation signal SI[m], corresponding to the respective stages, held in the M shift registers SR, at a rising timing of the latch signal LAT.

Meanwhile, an operation period which is a period in which the solid object shaping apparatus 1 performs the shaping process includes a plurality of unit periods Tu. In the present embodiment, each of the unit periods Tu is formed of three control periods Ts (Ts1 to Ts3). In the present embodiment, the three control periods Ts1 to Ts3 have the same duration. As will be described later in detail, the unit period Tu is defined by the latch signal LAT, and the control period Ts is defined by the latch signal LAT and the change signal CH.

The control portion 6 supplies the waveform designation signal SI to the driving signal generation portion 31 at a timing before the unit period Tu starts. The control portion 6 supplies the latch signal LAT to each latch circuit LT of the driving signal generation portion 31 so that the waveform designation signal SI[m] is latched for each unit period Tu.

The m-th stage decoder DC decodes the 2-bit waveform designation signal SI[m] latched by the m-th latch circuit LT, and outputs a selection signal Sel[m] which is set to either a high level ("H" level) or a low level ("L" level) in each of the control periods Ts1 to Ts3.

Figures 8, 9:
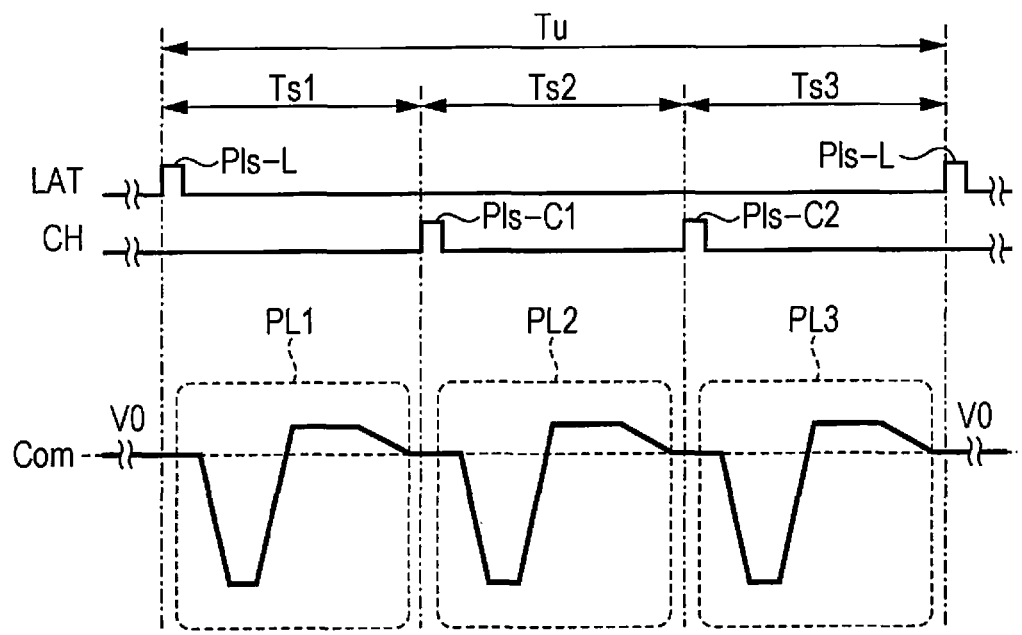
FIG. 8 is a diagram illustrating the content of a selection signal.
FIG. 9 is a timing chart illustrating a waveform of a driving waveform signal.

FIG. 8 is a diagram for explaining the content decoded by the decoder DC.

As illustrated in FIG. 8, the m-th stage decoder DC sets the selection signal Sel[m] to an "H" level in the control periods Ts1 to Ts3 if the content indicated by the waveform designation signal SI[m] is (b1, b2)=(1, 1). The m-th stage decoder DC sets the selection signal Sel[m] to an "H" level in the control periods Ts1 and Ts2 and sets the selection signal Sel[m] to an "L" level in the control period Ts3 if the content indicated by the waveform designation signal SI[m] is (b1, b2)=(1, 0). The m-th stage decoder DC sets the selection signal Sel[m] to an "H" level in the control period Ts1 and sets the selection signal Sel[m] to "L" level in the control periods Ts2 and Ts3 if the content indicated by the waveform designation signal SI[m] is (b1, b2)=(0, 1). The m-th stage decoder DC sets the selection signal Sel[m] to an "L" level in the control periods Ts1 to Ts3 if the content indicated by the waveform designation signal SI[m] is (b1, b2)=(0, 0).

As illustrated in FIG. 7, the M transmission gates TG included in the driving signal generation portion 31 are provided so as to respectively correspond to the M ejecting portions D of the recording head 30.

The m-th stage transmission gate TG is turned on when the selection signal Sel[m] output from the m-th stage decoder DC is in an "H" level, and is turned off when the selection signal Sel[m] is in an "L" level. The driving waveform signal Com is supplied to one end of each transmission gate TG. The other end of the m-th stage transmission gate TG is electrically connected to an m-th stage output end OTN.

If the selection signal Sel[m] is brought into an "H" level, and thus the m-th stage transmission gate TG is turned on, the driving waveform signal Com is supplied from the m-th stage output end OTN to the ejecting portion D[m] as the driving signal Vin[m].

As will be described later in detail, in the present embodiment, a potential of the driving waveform signal Com is set to a reference potential V0 at timings (that is, start and end timings of the control periods Ts1 to Ts3) at which the transmission gate TG is switched from an ON state to an OFF state. For this reason, in a case where the transmission gate TG is turned off, a potential of the output end OTN is maintained in the reference potential V0 due to the capacity of the piezoelectric element 300 of the ejecting portion D[m]. Hereinafter, for convenience of description, the description will be made assuming that, if the transmission gate TG is turned off, a potential of the driving signal Vin[m] is maintained as the reference potential V0.

As described above, the control portion 6 controls the driving signal generation portion 31 so that the driving signal Vin is supplied to each ejecting portion D for each unit period Tu. Consequently, each ejecting portion D can eject ink in an amount corresponding to a value indicated by the waveform designation signal SI which is defined on the basis of the waveform designation signal SI, and can thus form dots on the shaping platform 45.

FIG. 9 is a timing chart for explaining various signals which are supplied from the control portion 6 to the driving signal generation portion 31 in each unit period Tu.

As exemplified in FIG. 9, the latch signal LAT includes a pulse waveform Pls-L, and the unit period Tu is defined by the pulse waveform Pls-L. The change signal CH includes a pulse waveform Pls-C, and the unit period Tu is divided into the control periods Ts1 to Ts3 by the pulse waveform Pls-C. Although not illustrated, the control portion 6 serially supplies the waveform designation signal SI to the driving signal generation portion 31 in synchronization with the clock signal CLK for each unit period Tu.

As exemplified in FIG. 9, the driving waveform signal Com includes a waveform PL1 disposed in the control period Ts1, a waveform PL2 disposed in the control period Ts2, and a waveform PL3 disposed in the control period Ts3. Hereinafter, the waveforms PL1 to PL3 are collectively referred to as a waveform PL in some cases. In the present embodiment, a potential of the driving waveform signal Com is set to the reference potential V0 at the start or end timing of each control period Ts.

In a case where the selection signal Sel[m] is in an "H" level in a certain control period Ts, the driving signal generation portion 31 supplies the waveform PL of the driving waveform signal Com disposed in the control period Ts to the ejecting portion D[m] as the driving signal Vin[m]. Conversely, in a case where the selection signal Sel[m] is in an "L" level in a certain control period Ts, the driving signal generation portion 31 supplies the waveform PL of the driving waveform signal Com set to the reference potential V0 to the ejecting portion D[m] as the driving signal Vin[m].

Therefore, the driving signal Vin[m] supplied to the ejecting portion D[m] in the unit period Tu by the driving signal generation portion 31 becomes a signal having the waveforms PL1 to PL3 if a value indicated by the waveform designation signal SI[m] is (b1, b2)=(1, 1). The driving signal Vin[m] becomes a signal having the waveforms PL1 and PL2 if a value indicated by the waveform designation signal SI[m] is (b1, b2)=(1, 0). The driving signal Vin[m] becomes a signal having the waveform PL1 if a value indicated by the waveform designation signal SI[m] is (b1, b2)=(0, 1). The driving signal Vin[m] becomes a signal set to the reference potential V0 if a value indicated by the waveform designation signal SI[m] is (b1, b2)=(0, 0).

If the driving signal Vin[m] having a single waveform PL is supplied, the ejecting portion D[m] ejects about a small amount of ink so as to form a small dot.

For this reason, in a case where a value indicated by the waveform designation signal SI[m] is (b1, b2)=(0, 1) and the driving signal Vin[m] supplied to the ejecting portion D[m] has a single waveform PL (PL1) in the unit period Tu, about a small amount of ink is ejected from the ejecting portion D[m] on the basis of the single waveform PL, and thus a small dot is formed by the ejected ink.

In a case where a value indicated by the waveform designation signal SI[m] is (b1, b2)=(1, 0) and the driving signal Vin[m] supplied to the ejecting portion D[m] has two waveforms PL (PL1 and PL2) in the unit period Tu, about a small amount of ink is ejected from the ejecting portion D[m] twice on the basis of the two waveforms PL, and a medium dot is formed through combination of about a small amount of ink ejected twice.

In a case where a value indicated by the waveform designation signal SI[m] is (b1, b2)=(1, 1) and the driving signal Vin[m] supplied to the ejecting portion D[m] has three waveforms PL (PL1 to PL3) in the unit period Tu, about a small amount of ink is ejected from the ejecting portion D[m] three times on the basis of the three waveforms PL, and a large dot is formed through combination of about a small amount of ink ejected three times.

On the other hand, in a case where a value indicated by the waveform designation signal SI[m] is (b1, b2)=(0, 0) and the driving signal Vin[m] supplied to the ejecting portion D[m] is maintained in the reference potential V0 without the waveform PL in the unit period Tu, ink is not ejected from the ejecting portion D[m], and thus no dot is formed (recording is not performed).

In the present embodiment, as is clear from the above description, a medium dot has a double size of a small dot, and a large dot has a triple size of the small dot.

In the present embodiment, the waveform PL of the driving waveform signal Com is defined so that about a small amount of ink ejected for forming a small dot is substantially a third of an amount of ink which is necessary in order to form a block BL. In other words, the block BL is formed of any one of three patterns including a single large dot, a combination of a single medium dot and a single small dot, and a combination of three small dots.

In the present embodiment, a single block BL is provided in a single voxel Vx. That is, in the present embodiment, dots are formed in a single voxel Vx in any one of three patterns including a single large dot, a combination of a single medium dot and a single small dot, and a combination of three small dots.

2. Data Generation Process and Shaping Process

Next, with reference to FIGS. 10 to 18B, a description will be made of the data generation process and the shaping process performed by the solid object shaping system 100.

2.1 Summary of Data Generation Process and Shaping Process

Figure 10:
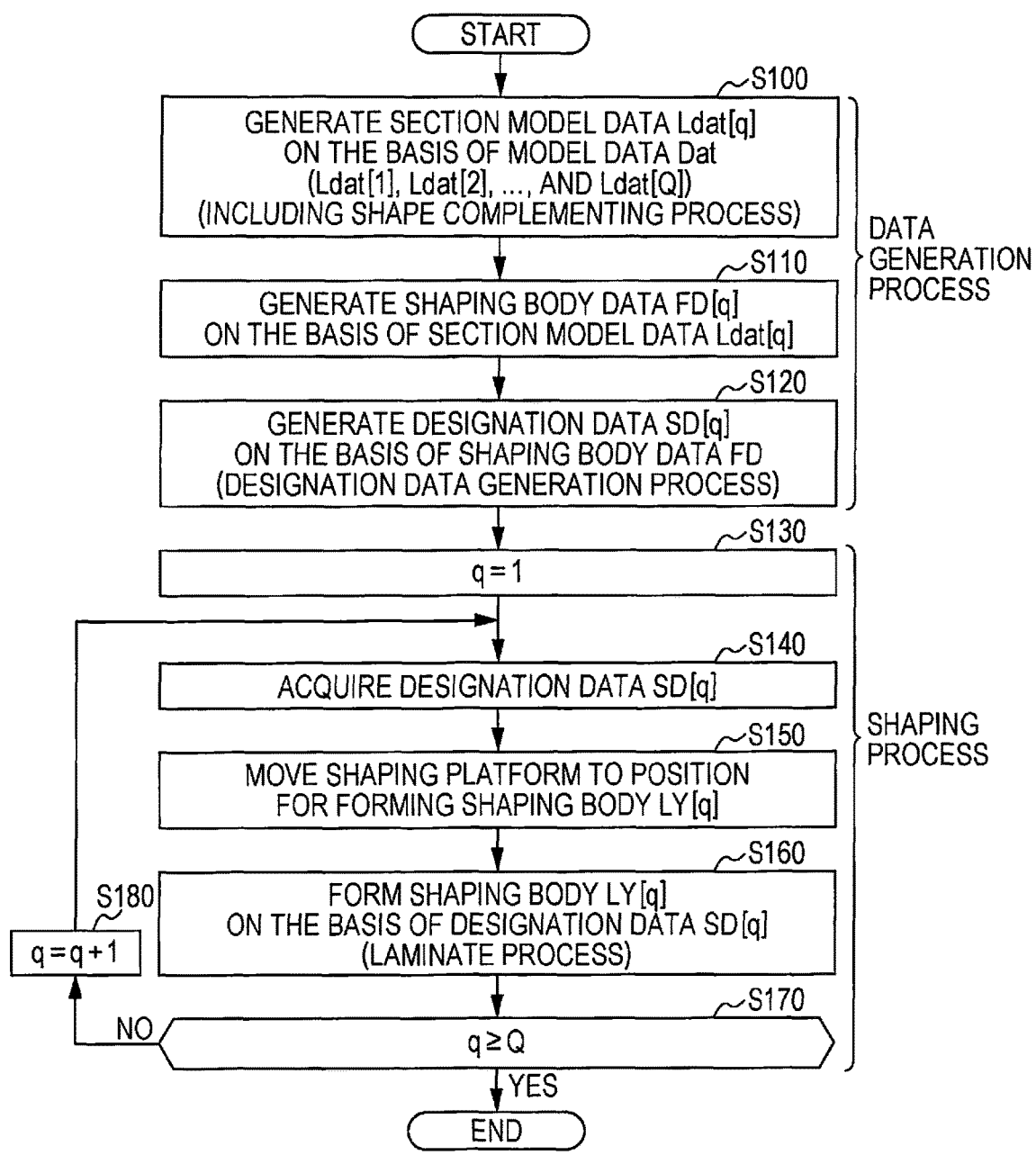
FIG. 10 is a flowchart illustrating a data generation process and a shaping process.

FIG. 10 is a flowchart illustrating an example of an operation of the solid object shaping system 100 in a case where the data generation process and the shaping process are performed.

The data generation process is a process performed by the designation data generation portion 93 of the host computer 9, and is started when the designation data generation portion 93 acquires the model data Dat output from the model data generation portion 92. Processes in steps S100, S110 and S120 illustrated in FIG. 10 correspond to the data generation process.

As illustrated in FIG. 10, if the data generation process is started, the designation data generation portion 93 generates the section model data Ldat[q] (Ldat[1] to Ldat[Q]) on the basis of the model data Dat output from the model data generation portion 92 (step S100). As described above, in step S100, the designation data generation portion 93 performs the shape complementing process of complementing a hollow portion of a shape indicated by the model data Dat is complemented, and generating the section model data Ldat which causes a part of a more inner region than an outer surface SF of a model of the solid object Obj indicated by the model data Dat or the entire region to have a solid shape. Details of the shape complementing process will be described later.

Next, the designation data generation portion 93 generates discrete shaping body data FD[q] by sorting shapes and colors indicated by the section model data Ldat[q] in the unit of the voxel Vx (step S110). In the present embodiment, a case is assumed in which a set of voxels Vx indicated by the shaping body data FD is provided to include the model indicated by the model data Dat (refer to FIGS. 18A and 18B).

Next, the designation data generation portion 93 performs a designation data generation process of determining a block BL (that is, arrangement of dots to be formed by the solid object shaping apparatus 1) to be formed by the solid object shaping apparatus 1 in order to form the shaping body LY[q] on the basis of the shaping body data FD and the model data Dat, and generating the designation data SD[q] on the basis of a determination result (step S120). Specifically, the designation data generation portion 93 generates the designation data SD by determining tones of a color representing the block BL to be formed in each voxel Vx in the designation data generation process in step S120. Details of the designation data generation process will be described later.

As mentioned above, the designation data generation portion 93 performs the data generation process indicated by steps S100 to S120 of FIG. 10.

The solid object shaping system 100 performs the data generation process and then performs the shaping process.

The shaping process is a process performed by the solid object shaping apparatus 1 under the control of the control portion 6, and is started when the designation data SD output from the host computer 9 is acquired by the solid object shaping apparatus 1 and is stored in the storage portion 60. Processes in steps S130 to S180 illustrated in FIG. 10 correspond to the shaping process.

As illustrated in FIG. 10, the control portion 6 sets a variable q indicating the number of laminate processes to be performed to "1" (step S130). Next, the control portion 6 acquires the designation data SD[q] generated by the designation data generation portion 93 from the storage portion 60 (step S140). The control portion 6 controls the lifting mechanism driving motor 71 so that the shaping platform 45 is moved to a position for forming the shaping body LY[q] (step S150).

The position of the shaping platform 45 for forming the shaping body LY[q] may be any position as long as ink ejected from the head unit 3 can be landed at the position with respect to a dot formation location (voxel Vxq) indicated by the designation data SD[q]. For example, in step S150, the control portion 6 may control a position of the shaping platform 45 so that a gap between the shaping body LY[q] and the head unit 3 in the Z axis direction is made constant. In this case, the control portion 6 may form the shaping body LY[q] in the q-th laminate process, and then may move the shaping platform 45 by the predetermined thickness ΔZ in the −Z direction until a shaping body LY[q+1] starts to be formed through a (q+1)-th laminate process.

Next, the control portion 6 controls operations of the head unit 3, the position changing mechanism 7, and the curing unit 61 (hereinafter, referred to as the "head unit 3 and the like") so that the shaping body LY[q] corresponding to the designation data SD[q] is formed (step S160). As is clear from FIGS. 2A to 2E, the shaping body LY[1] is formed on the shaping platform 45, and the shaping body LY[q+1] is formed on the shaping body LY[q].

Thereafter, the control portion 6 determines whether or not q satisfies "q≥Q" (step S170), and determines that shaping of the solid object Obj is completed and finishes the shaping process if a determination result is affirmative. On the other hand, if a determination result is negative, 1 is added to the variable q, and the process proceeds to step S140 (step S180).

As mentioned above, the designation data generation portion 93 of the solid object shaping system 100 performs the data generation process indicated by steps S100 to S120 of FIG. 10, and thus the designation data SD[1] to SD[Q] is generated on the basis of the model data Dat. The solid object shaping apparatus 1 of the solid object shaping system 100 performs the shaping process indicated by steps S130 to S180 of FIG. 10 under the control of the control portion 6, and thus such a solid object Obj which reproduces a shape and a color of a model indicated by the model data Dat is shaped.

FIG. 10 illustrates only an example of a flow of the data generation process and the shaping process. For example, in FIG. 10, the data generation process is completed and then the shaping process is started, but the invention is not limited to such an aspect, and the shaping process may be started before the data generation process is completed. For example, in a case where the designation data SD[q] is generated in the data generation process, a shaping process (that is, the q-th laminate process) of forming the shaping body LY[q] may be performed after the designation data SD[q] is acquired without waiting for the next designation data SD[q+1] to be generated.

2.2 Shape Complementing Process

As described above, in step S100, the designation data generation portion 93 performs the shape complementing process of complementing a part of or the hollow portion of a shape of the outer surface SF of the model of the solid object Obj designated by the model data Dat and generating the section model data Ldat which causes a part of a more inner region than the outer surface SF or the entire region to have a solid structure.

Hereinafter, with reference to FIGS. 11A to 12, a description will be made of a more inner structure than the outer surface SF of the model of the solid object Obj indicated by the section model data Ldat and the shape complementing process of defining the more inner structure than the outer surface SF.

First, with reference to FIGS. 11A and 11B, a description will be made of a more inner structure than the outer surface SF of the model of the solid object Obj indicated by the section model data Ldat.

Figure 11A:
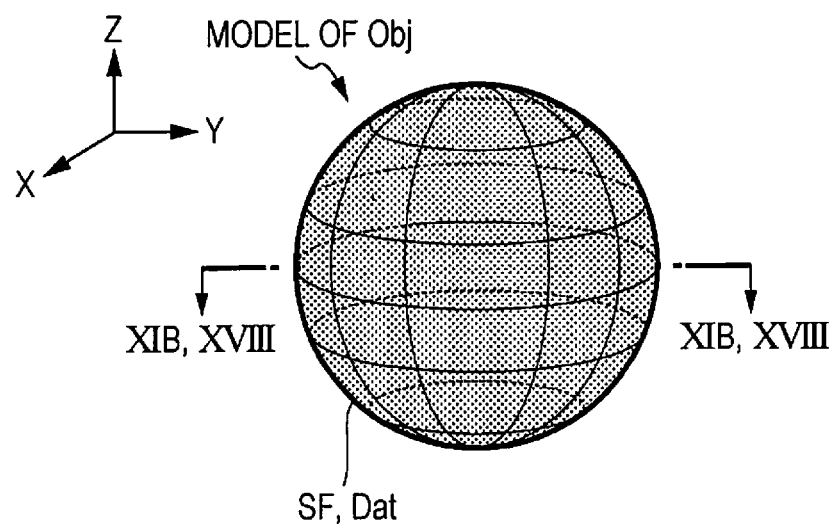
FIGS. 11A and 11B are diagrams for explaining a solid object.
Figure 11B:
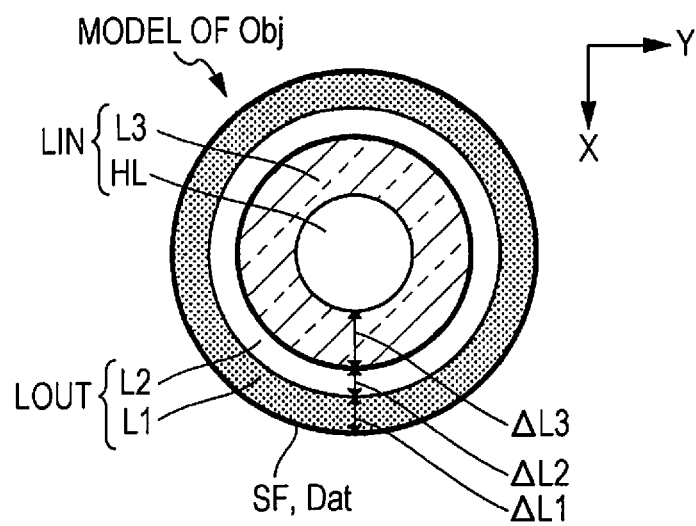

Here, FIG. 11A is a perspective view of the model of the solid object Obj indicated by the section model data Ldat, and FIG. 11B is a sectional view obtained when cutting the model of the solid object Obj illustrated in FIG. 11A on a plane parallel to the X axis and the Y axis along a straight line XIB-XIB. In FIGS. 11A and 11B, for convenience of illustration, a case is assumed in which a spherical solid object Obj having a shape which is different from that in FIGS. 2A to 3.

As illustrated in FIG. 11B, the solid object Obj shaped on the basis of the section model data Ldat includes three layers such as a colored layer L1, a shield layer L2, and an inner layer L3, and a hollow portion HL which is located further inward than the three layers, in this order toward the inside of the solid object Obj from a surface of the solid object Obj.

Here, the colored layer L1 is a layer which is formed by ink containing shaping ink, and is a layer including the surface of the solid object Obj for representing a color of the solid object Obj. The shield layer L2 is a layer which is formed by using, for example, white ink, and is a layer for preventing a color of a more inner portion than the colored layer L1 in the solid object Obj from being transmitted through the colored layer L1 and being thus visually recognized from the outside of the solid object Obj. In other words, the colored layer L1 and the shield layer L2 are provided so that a color to be displayed by the solid object Obj is accurately represented. Hereinafter, in the solid object Obj, the colored layer L1 and the shield layer L2, which are provided so that a color to be displayed by the solid object Obj is accurately represented, are referred to as an outer region LOUT of the solid object Obj in some cases.

The inner layer L3 is a layer which is provided to ensure the intensity of the solid object Obj, and is formed by using clear ink as a principle. Hereinafter, in the solid object Obj, the inner layer L3 and the hollow portion HL provided further inward than the outer region LOUT are referred to as an inner region LIN (or the "inside of the solid object Obj") of the solid object Obj in some cases.

In the present embodiment, for simplification, as illustrated in FIG. 11B, a case is assumed that the colored layer L1 has a substantially uniform thickness ΔL1, the shield layer L2 has a substantially uniform thickness ΔL2, and the inner layer L3 has a substantially uniform thickness ΔL3, but a thickness of each layer may not be substantially uniform.

In the present specification, the expression such as "substantially uniform" or "substantially the same" includes not only a case of being completely uniform or the same but also a case of being regarded to be uniform or the same if various errors are ignored. The various errors which can be ignored are assumed to include discrete errors occurring when a shape indicated by the model data Dat is represented as a set of voxels Vx.

Figure 12:
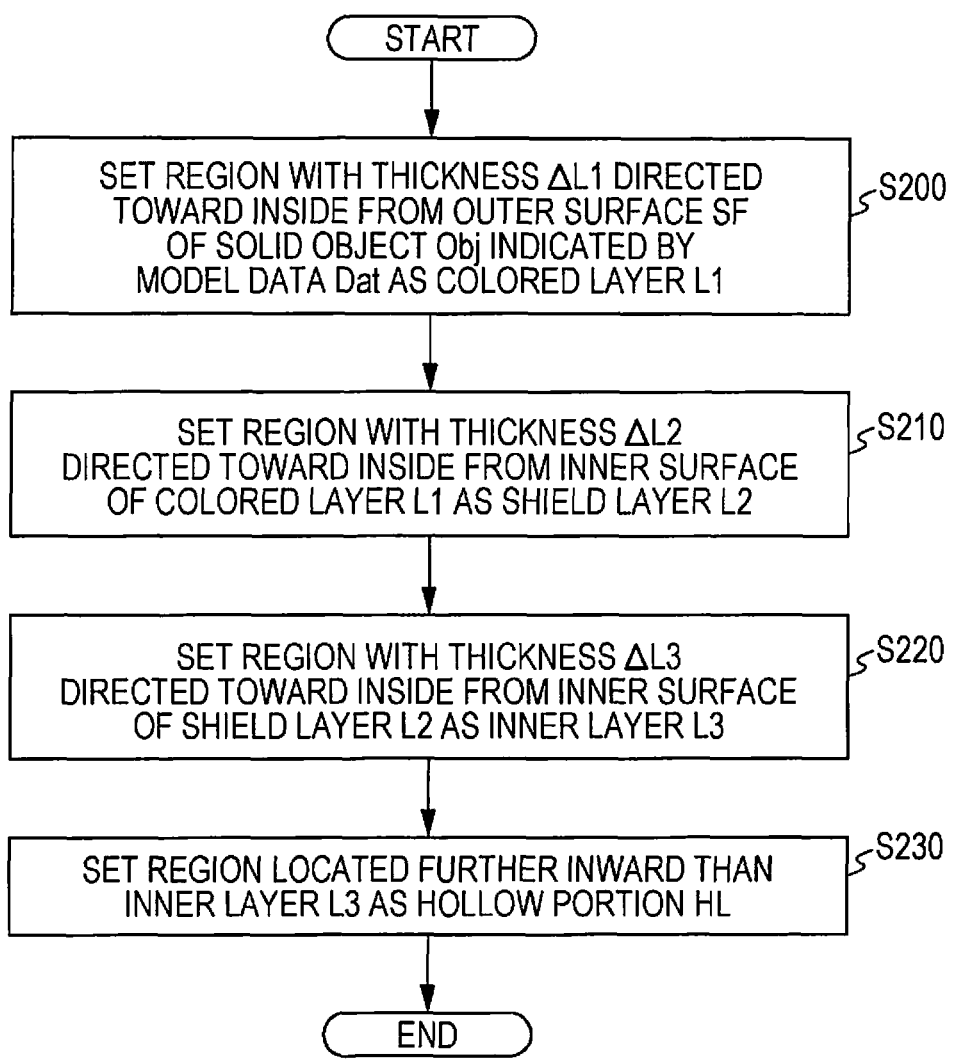
FIG. 12 is a flowchart illustrating a shape complementing process.

FIG. 12 is a flowchart illustrating an example of an operation of the designation data generation portion 93 in a case of performing the shape complementing process.

As illustrated in FIG. 12, first, the designation data generation portion 93 sets a region with the thickness ΔL1 which is directed from the outer surface SF of the model of the solid object Obj toward the inside of the model of the solid object Obj as the colored layer L1 in the model of the solid object Obj indicated by the model data Dat (step S200). The designation data generation portion 93 sets a region with the thickness ΔL2 which is directed from an inner surface of the colored layer L1 toward the inside of the model of the solid object Obj as the shield layer L2 (step S210). The designation data generation portion 93 sets a region with the thickness ΔL3 which is directed from an inner surface of the shield layer L2 toward the inside of the model of the solid object Obj as the inner layer L3 (step S220). The designation data generation portion 93 sets a portion of the model of the solid object Obj located further inward than the inner layer L3 as the hollow portion HL (step S230).

The designation data generation portion 93 performs the above-described shape complementing process so as to generate the section model data Ldat for shaping the solid object Obj having the colored layer L1, the shield layer L2, and the inner layer L3 as exemplified in FIG. 11B.

2.3 Designation Data Generation Process

In step S120, the designation data generation portion 93 performs the designation data generation process of determining tones of a color of the block BL to be formed in each voxel Vx on the basis of the shaping body data FD and the model data Dat and generating the designation data SD on the basis of the determination result and the shaping body data FD. Hereinafter, the designation data generation process will be described.

Figure 13:
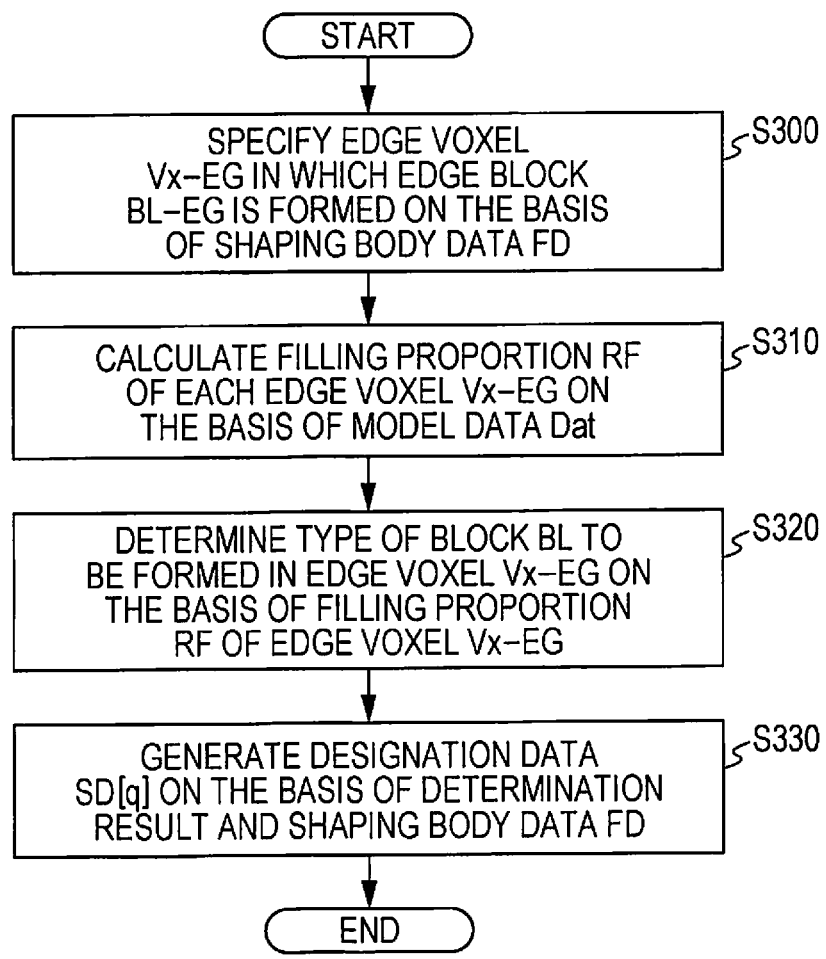
FIG. 13 is a flowchart illustrating a designation data generation process.

FIG. 13 is a flowchart illustrating an example of an operation of the designation data generation portion 93 in a case of performing the designation data generation process. Hereinafter, a description will be made of summary of the designation data generation process with reference to FIG. 13.

As illustrated in FIG. 13, first, the designation data generation portion 93 specifies an edge voxel Vx-EG which is a voxel Vx in which an edge block BL-EG constituting a projection of a surface of the solid object Obj is formed among a plurality of blocks BL constituting the solid object Obj on the basis of the shaping body data FD (step S300). In a case where the solid object Obj includes a plurality of edge blocks BL-EG, the designation data generation portion 93 satisfies a plurality of edge voxels Vx-EG which respectively correspond to the plurality of edge blocks BL-EG.

Next, the designation data generation portion 93 calculates a filling proportion RF which is a proportion of a volume occupied by a more inner portion than the outer surface SF of the model of the solid object Obj indicated by the model data Dat to a total volume of the edge voxel Vx-EG in the edge voxel Vx-EG in relation to each edge voxel Vx-EG (step S310).

Next, the designation data generation portion 93 determines the type of block BL to be formed in the edge voxel Vx-EG on the basis of the filling proportion RF of each edge voxel Vx-EG (step S320). The type of block BL will be described later.

The designation data generation portion 93 generates the designation data SD on the basis of the determination result in step S320 and the shaping body data FD (step S330).

Hereinafter, the respective processes in steps S300 to S330 performed in the designation data generation process will be described.

As described above, the designation data generation portion 93 specifies the edge voxel Vx-EG in which the edge block BL-EG is formed in step S300.

Here, the edge block BL-EG is a block BL in which two or more faces of six faces of a rectangular parallelepiped forming the block BL are exposed to the outside of the solid object Obj as a surface of the solid object Obj. The edge voxel Vx-EG is a voxel Vx in which the edge block BL-EG is formed. Hereinafter, a block BL which is not the edge block BL-EG is referred to as a non-edge block BL-PL, and a voxel Vx in which the non-edge block BL-PL is formed is referred to as a non-edge voxel Vx-PL, in some cases.

Figure 14:
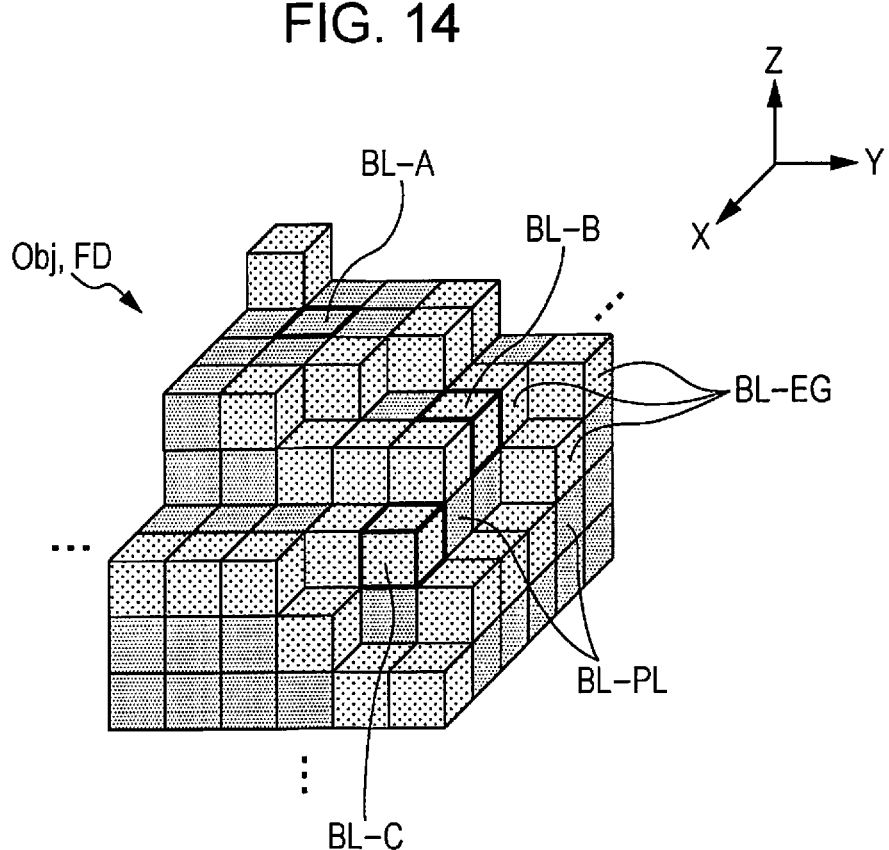
FIG. 14 is a diagram for explaining an edge block.

FIG. 14 is a diagram illustrating an example of a partial surface of the solid object Obj in order to explain the edge voxel Vx-EG. In FIG. 14, the edge block BL-EG is represented as a block BL which is hatched in a light color, and the non-edge block BL-PL is represented as a block BL which is hatched in a dark color.

Figure 15A:
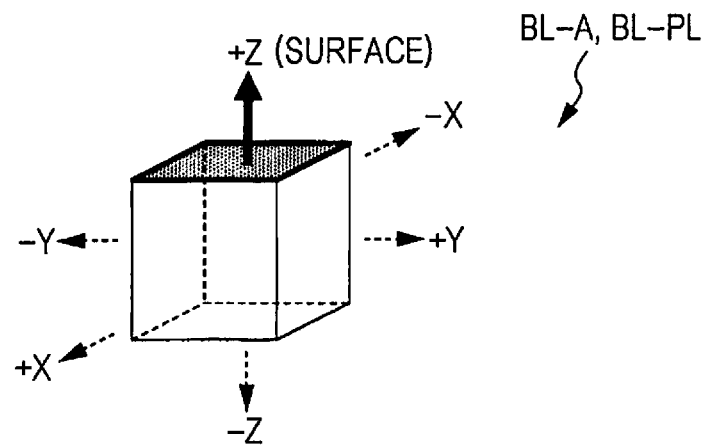
FIGS. 15A to 15C are diagrams for explaining an edge block.

For example, in a block BL-A illustrated in FIG. 14, as illustrated in FIG. 15A, a face which is directed in the +Z direction is exposed to the outside of the solid object Obj as the surface of the solid object Obj, and other five faces are adjacent to other blocks BL. For this reason, the block BL-A is the non-edge block BL-PL formed in the non-edge voxel Vx-PL.

Figure 15B:
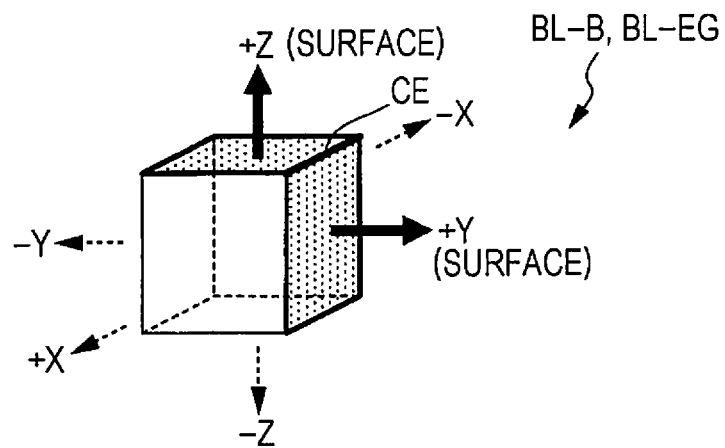

In contrast, in a block BL-B illustrated in FIG. 14, as illustrated in FIG. 15B, two faces including a face directed in the +Z direction and a face directed in the +Y direction are exposed to the outside of the solid object Obj as the surface of the solid object Obj. For this reason, the block BL-B is the edge block BL-EG formed in the edge voxel Vx-EG.

Figure 15C:
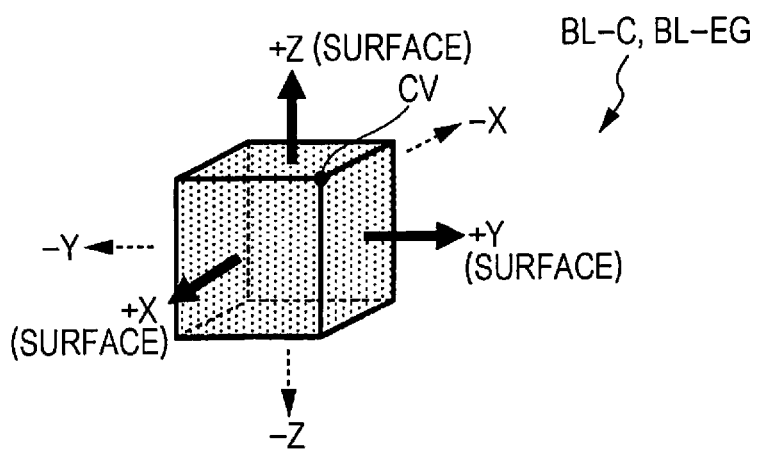

In a block BL-C illustrated in FIG. 14, as illustrated in FIG. 15C, three faces including a face directed in the +Z direction, a face directed in the +Y direction, and a face directed in the +X direction are exposed to the outside of the solid object Obj as the surface of the solid object Obj. For this reason, the block BL-C is the edge block BL-EG formed in the edge voxel Vx-EG.

As illustrated in FIGS. 14 and 15B, in the block BL-B, the two faces exposed to the outside of the solid object Obj, that is, the face directed in the +Z direction and the face directed in the +Y direction share a single side CE. The side CE forms a ridgeline exposed to the surface of the solid object Obj. For this reason, there is a high possibility that, among the six faces of the block BL-B, the two faces exposed to the outside of the solid object Obj and sharing the side CE may be visually recognized as a projection of irregularities of the surface of the solid object Obj.

As illustrated in FIGS. 14 and 15C, in the block BL-C, the three faces exposed to the outside of the solid object Obj, that is, the face directed in the +Z direction, the face directed in the +Y direction, and the face directed in the +X direction share a single vertex CV. The vertex CV is a vertex exposed to the surface of the solid object Obj. For this reason, there is a high possibility that, among the six faces of the block BL-C, the three faces exposed to the outside of the solid object Obj and sharing the vertex CV may be visually recognized as a projection of irregularities of the surface of the solid object Obj.

Referring to FIG. 13 again, as described above, the designation data generation portion 93 calculates the filling proportion RF of each edge voxel Vx-EG in step S310.

Figure 16A:
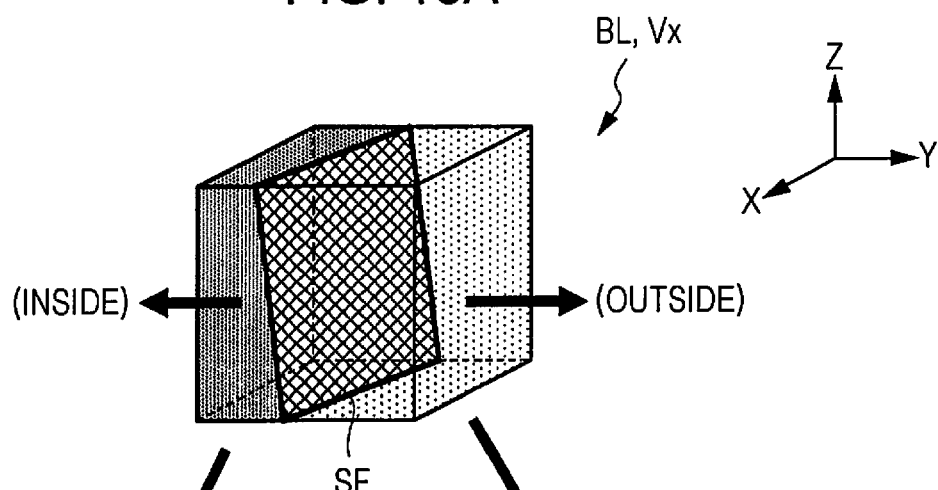
FIGS. 16A to 16C are diagrams for explaining a filling ratio.
Figure 16B:
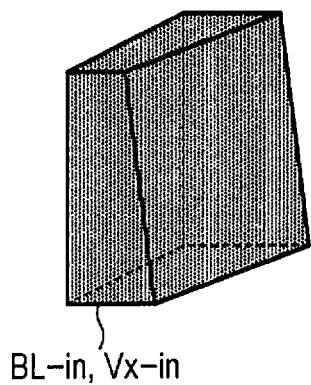
Figure 16C:
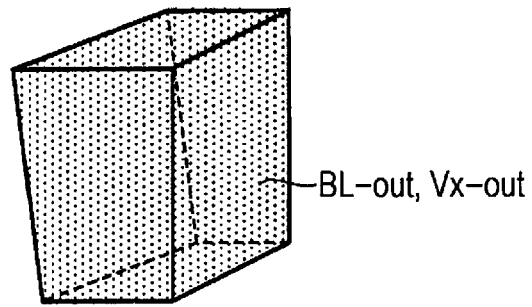

Specifically, first, in a case of assuming that the model of the solid object Obj indicted by the model data Dat and a set of voxels Vx indicated by the shaping body data FD are disposed at the same position in an overlapping manner, as illustrated in FIG. 16A, the designation data generation portion 93 determines whether or not the edge voxel Vx-EG is divided into an inner portion Vx-in of the model and an outer portion Vx-out of the model by the outer surface SF of the model indicated by the model data Dat. In other words, it is determined whether or not the edge block BL-EG is divided into an inner portion BL-in of the model and an outer portion BL-out of the model.

In a case where a determination result is affirmative, that is, the edge voxel Vx-EG is divided into the inner portion Vx-in and the outer portion Vx-out of the model, the designation data generation portion 93 calculates a proportion of a volume of the inner portion Vx-in occupying the edge voxel Vx-EG or a proportion of a volume of the inner portion BL-in occupying the edge block BL-EG as the filling proportion RF.

Referring to FIG. 13 again, as described above, the designation data generation portion 93 determines the type of block BL which is to be formed in the edge voxel Vx-EG on the basis of the filling proportion RF of the edge voxel Vx-EG in step S320.

FIG. 17 is a diagram for explaining determination of the type of block BL in the designation data generation portion 93.

In step S320, as illustrated in FIG. 17, in a case where the filling proportion RF of the edge voxel Vx-EG satisfies "α1<RF", the designation data generation portion 93 sets the type of block BL which is to be formed in the edge voxel Vx-EG, to an identical color block BL1.

The reference value α1 (an example of a "first reference value") is a value satisfying "0<α1". The identical color block BL1 (an example of a "first unit shaping body") is a block BL having a color which is the same as a color designated for the voxel Vx by the shaping body data FD. In other words, the identical color block BL1 is a block BL which is formed to have an amount of colorant components required to represent a color indicated by the model data Dat in the voxel Vx.

In step S320, as illustrated in FIG. 17, in a case where the filling proportion RF of the edge voxel Vx-EG satisfies "α2≤RF≤α1", the designation data generation portion 93 sets the type of block BL which is to be formed in the edge voxel Vx-EG to a light color block BL2.

The reference value α2 (an example of a "second reference value") is a value satisfying "0≤α2≤α1". The light color block BL2 (an example of a "second unit shaping body") is a block BL having a color obtained by lightening a color designated for the voxel Vx by the shaping body data FD. In other words, the light color block BL2 is a block BL which is formed to have an amount of colorant components which is smaller than an amount of colorant components required to represent a color indicated by the model data Dat in the voxel Vx.

However, even in a case where the filling proportion RF of the edge voxel Vx-EG satisfies "α2≤RF≤α1", if a color designated for the edge voxel Vx-EG by the shaping body data FD is a clear color (CL), the designation data generation portion 93 sets the type of block BL which is to be formed in the edge voxel Vx-EG, to the identical color block BL1 (that is, a block BL formed by using the clear ink).

As illustrated in FIGS. 14 and 15B, in the block BL-B, two faces including a face directed in the −Z direction and a face directed in the −Y direction are adjacent to the identical color blocks BL1. In other words, among the light color blocks BL2, in the light color block BL2 whose two faces are exposed to the surface of the solid object Obj as in the block BL-B, the face on an opposite side to the face exposed as the surface of the solid object Obj is adjacent to the identical color block BL1 as a principle.

In step S320, as illustrated in FIG. 17, in a case where the filling proportion RF of the edge voxel Vx-EG satisfies "RF<α2", the designation data generation portion 93 determines that a block BL is not formed in the edge voxel Vx-EG.

Referring to FIG. 13 again, as described above, in step S330, the designation data generation portion 93 generates the designation data SD on the basis of the type of block BL determined in step S320 and the shaping body data FD.

Specifically, the designation data generation portion 93 generates the designation data SD designating formation of a dot with the same color as a color designated for the voxel Vx by the shaping body data FD in relation to the voxel Vx in which the identical color block BL1 is determined to be formed in step S320. In addition, the designation data generation portion 93 generates the designation data SD designating formation of a dot with a color obtained by lightening a color designated for the voxel Vx by the shaping body data FD in relation to the voxel Vx in which the light color block BL2 is determined to be formed in step S320.

Figure 18A:
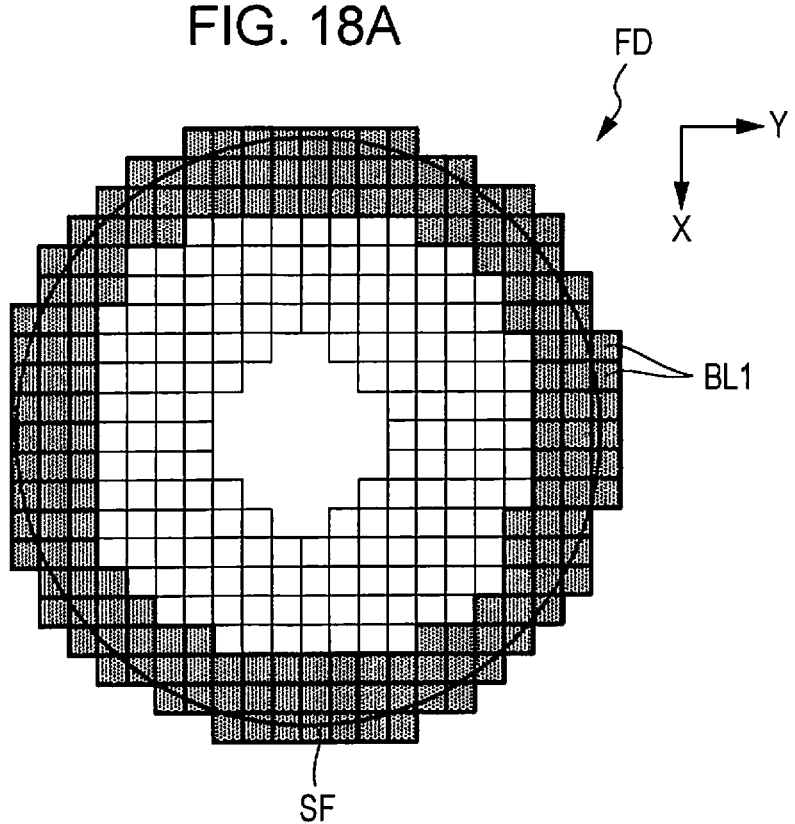
FIGS. 18A and 18B are diagrams for explaining a relationship between solid object data and designation data.
Figure 18B:
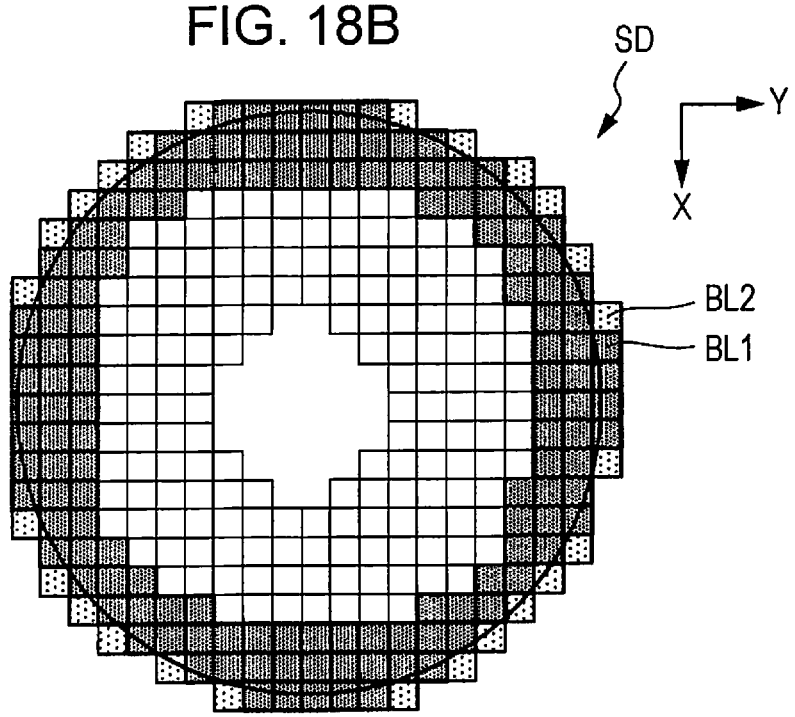

FIGS. 18A and 18B are diagrams for explaining a solid object Obj (refer to FIG. 18A) indicated by the shaping body data FD and a solid object Obj (refer to FIG. 18B) indicated by the designation data SD. FIGS. 18A and 18B are sectional views obtained when cutting the solid object Obj illustrated in FIG. 11A on the plane parallel to the X axis and the Y axis along the straight line XVIII-XVIII. In FIGS. 18A and 18B, blocks BL constituting the colored layer L1 are hatched, and blocks BL constituting the shield layer L2 and the inner layer L3 are illustrated white. In FIGS. 18A and 18B, among the blocks BL constituting the colored layer L1, the identical color block BL1 is hatched in a dark color, and the light color block BL2 is hatched in a light color.

As illustrated in FIG. 18A, in a case where the solid object Obj is formed on the basis of the shaping body data FD, the colored layer L1 including the surface of the solid object Obj is constituted of a plurality of identical color blocks BL1. In this case, the light color block BL2 is not included in the surface of the colored layer L1 of the solid object Obj.

On the other hand, as illustrated in FIG. 18B, in a case where the solid object Obj is formed on the basis of the designation data SD, the surface of the solid object Obj is constituted of a plurality of identical color blocks BL1 and a plurality of light color blocks BL2. In other words, the solid object shaping apparatus 1 according to the present embodiment shapes the solid object Obj having the surface constituted of a plurality of identical color blocks BL1 and a plurality of light color blocks BL2 on the basis of the designation data SD. More specifically, the solid object shaping apparatus 1 according to the present embodiment forms a projection of the irregularities of the surface of the solid object Obj by using the light color block BL2 which is lighter than a color indicated by the model data Dat instead of the identical color block BL1 with the same color as the color indicated by the model data Dat. For this reason, the projection of the irregularities of the surface of the solid object Obj can be constituted of the block BL with the color which is not visible, and thus it is possible to minimize the possibility that the projection may be visually recognized as being rough.

In order to form the light color block BL2 in a certain voxel Vx instead of the identical color block BL1, an amount of colorant components of ink for forming a block BL formed in the voxel Vx may be adjusted to be reduced. Specific methods of adjusting and reducing an amount of colorant components of ink for forming the block BL may be any methods.

In the present embodiment, compared with designation based on the shaping body data FD, an amount of colorant components of ink for forming the block BL is reduced by increasing a proportion of clear ink included in the block BL. In other words, in the present embodiment, compared with designation based on the shaping body data FD, an amount of colorant components of chromatic ink or achromatic ink is reduced by reducing a proportion of the chromatic ink or the achromatic ink included in the block BL. For example, in a case where the shaping body data FD designates cyan as a color of a voxel Vx in which the light color block BL2 is to be formed, the designation data generation portion 93 generates the designation data SD designating that the light color block BL2 formed by cyan ink and clear ink is formed in the voxel Vx. Specifically, in a case where the shaping body data FD designates that a large dot formed by cyan ink is formed in a voxel Vx in which the light color block BL2 is to be formed, the designation data generation portion 93 may generates the designation data SD designating that the light color block BL2 constituted of, for example, a medium dot formed by cyan ink and a small dot formed by clear ink is formed in the voxel Vx.

3. Conclusion of Embodiment

As described above, in the present embodiment, in an edge block BL-EG constituting a projection of the surface of the solid object Obj, if a filling proportion RF of an edge voxel Vx-EG in which the edge block BL-EG is formed is equal to or less than the reference value al, a light color block BL2 having a color which is lighter than a color indicated by the model data Dat is used as the edge block BL-EG. For this reason, the projection of irregularities of the surface of the solid object Obj can be constituted of a block BL having an invisible color, and thus it is possible to minimize the possibility that the projection may be visually recognized as being rough.

In the present embodiment, in an edge block BL-EG constituting a projection of the surface of the solid object Obj, if a filling proportion RF of an edge voxel Vx-EG in which the edge block BL-EG is formed is more than the reference value al, an identical color block BL1 having the same color as a color indicated by the model data Dat is used as the edge block BL-EG. For this reason, it is possible to reduce the possibility that a solid object Obj shaped by the solid object shaping apparatus 1 may be visually recognized as an object having a color which is lighter than a color of a model of the solid object Obj indicated by the model data Dat.

As mentioned above, the solid object shaping system 100 according to the present embodiment can prevent a color of a solid object Obj from being lighter than a color of a model of a solid object Obj indicated by the model data Dat and also to prevent a projection of a surface of the solid object Obj from being visually recognized as being rough.

B. MODIFICATION EXAMPLES

The above-described embodiment may be variously modified. Specific modification aspects will be exemplified below. Two or more aspects which are arbitrarily selected from the following examples may be combined with each other as appropriate within the scope which does not cause contradiction to each other.

In modification examples described below, elements whose operations or functions are equivalent to those in the embodiment are given the same reference numerals in the above description, and a detailed description thereof will be omitted as appropriate.

Modification Example 1

In the above-described embodiment, ink which can be ejected by the solid object shaping apparatus 1 is a total of six types of ink including three color types of chromatic ink, white ink, clear ink, and support ink, but the invention is not limited to such an aspect. For example, the solid object shaping apparatus 1 may eject at least two types of ink including a single type of chromatic ink (an example of a "first liquid" which is hereinafter referred to as "first ink"), and ink (an example of a "second liquid" which is hereinafter referred to as "second ink") having an amount of chromatic colorant components which is smaller than an amount of colorant components of the first ink per unit volume.

Here, the second ink may be chromatic ink, achromatic ink, and clear ink. Specifically, the second ink may be chromatic ink having a colorant component of the same color as a color of the first ink, may be white ink, and may be clear ink.

In a case where the identical color block BL1 is formed by the first ink, the light color block BL2 may be formed by including at least the second ink. Specifically, the light color block BL2 may be formed by the second ink, and may be formed by the first ink and the second ink.

The above-described embodiment exemplifies a case where the second ink is clear ink, and the light color block BL2 is formed by the first ink and the second ink. In other words, in the above-described embodiment, in a case where the light color block BL2 is formed instead of the identical color block BL1, a proportion of clear ink included in a block BL is increased in order to reduce an amount of colorant components of ink for forming the block BL.

However, the above-described embodiment is only an example, and ink for forming the block BL may be changed from the first ink to the second ink in order to reduce an amount of colorant components of the ink for forming the block BL. In other words, in a case where the shaping body data FD designates that an identical color block BL1 formed by the first ink is formed in a voxel Vx, the designation data generation portion 93 may generate the designation data SD designating that a light color block BL2 formed by the second ink is formed in the voxel Vx.

In this case, the second ink is preferably chromatic ink having a color obtained by lightening a color of the first ink. For example, in a case where the first ink is cyan ink, the second ink is preferably light cyan ink, and in a case where the first ink is magenta ink, the second ink is light magenta ink. Here, the light magenta ink is ink having the same colorant component as that of the cyan ink, and has the lower content of the colorant components per unit volume than that of the cyan ink. The light magenta ink is ink having the same colorant component as that of the magenta ink, and has the lower content of the colorant components per unit volume than that of the magenta ink.

Modification Example 2

In the above-described embodiment and modification example, even in a case where a filling proportion RF of an edge voxel Vx-EG satisfies "α2≤RF≤α1", if a color designated for the edge voxel Vx-EG by the shaping body data FD is a clear color (CL), an identical color block BL1 is formed in the edge voxel Vx-EG instead of forming a light color block BL2 (refer to FIG. 17), but this is only an example, and an edge voxel Vx-EG in which the light color block BL2 is not formed is not limited to an edge voxel Vx-EG for which a clear color (CL) is designated. For example, the light color block BL2 may not also be formed in an edge voxel Vx-EG for which the shaping body data FD designates a color which is higher in brightness and is light, such as yellow (YL) or white (WT).

Modification Example 3

In the above-described embodiment and modification examples, tones of a color of an edge block BL-EG are adjusted by using binary values based on two types of blocks BL such as the identical color block BL1 and the light color block BL2, but the invention is not limited to such an aspect, and tones of a color of an edge block BL-EG may be adjusted by using ternary values.

For example, as described in the embodiment, in a case where an amount of colorant components of ink for forming a block BL is adjusted by changing a proportion of clear ink included in the block BL, tones may be adjusted by using ternary values such as (1) not forming a dot formed by the clear ink in the block BL, (2) forming a small dot formed by the clear ink in the block BL, and (3) forming a medium dot formed by the clear ink in the block BL.

For example, as described in Modification Example 1, in a case where an amount of colorant components of ink for forming a block BL is adjusted by switching the type of ink for forming the block BL, the solid object shaping apparatus 1 may eject not only the first ink and the second ink, but also ink (an example of a "third liquid" which is hereinafter referred to as "third ink") which is chromatic ink having a chromatic colorant component of the same color as a color of the first ink and has an amount of chromatic colorant components which is smaller than an amount of colorant components of the second ink per unit volume. In this case, tones may be adjusted by using ternary values such as (1) forming the block BL by the first ink, (2) forming the block BL by the second ink, and (3) forming the block BL by the third ink.

Modification Example 4

In the above-described embodiment and modification examples, the designation data generation portion 93 generates the shaping body data FD defining such a set of voxels Vx including the entire model of a solid object Obj indicated by the model data Dat, but the invention is not limited to such an aspect. The designation data generation portion 93 may generate the shaping body data FD defining such a set of voxels Vx which does not include a part of a model of a solid object Obj indicated by the model data Dat.

Figure 19A:
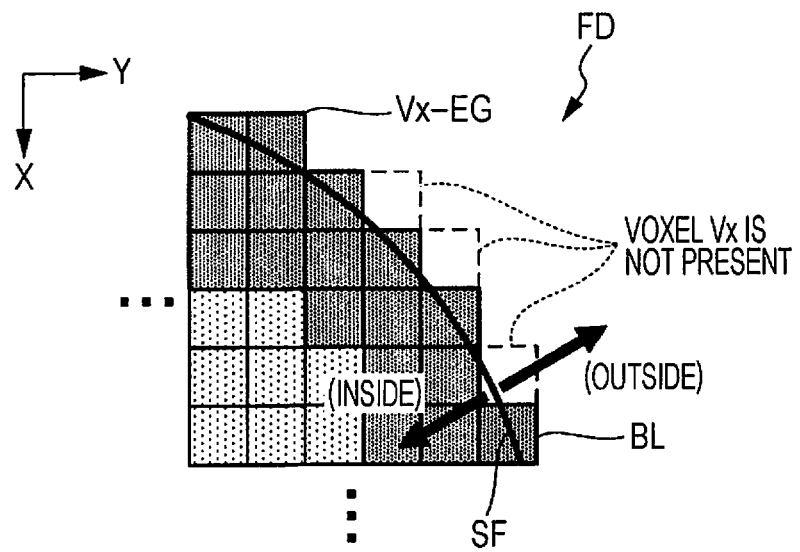
FIGS. 19A and 19B are diagrams for explaining an external voxel.
Figure 19B:
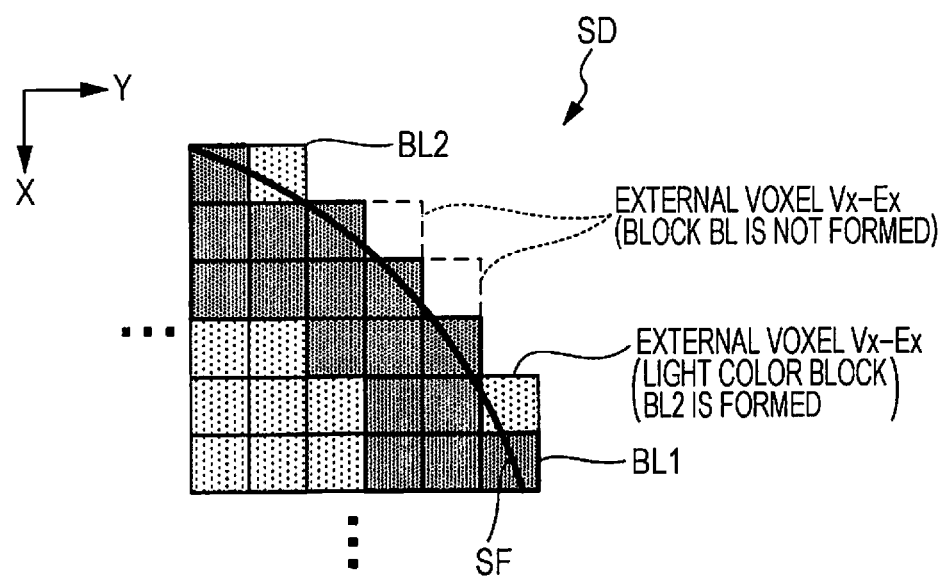

FIGS. 19A and 19B are diagrams for explaining a relationship between an outer surface SF of a model of a solid object Obj indicated by the model data Dat, and the shaping body data FD and the designation data SD according to the present modification example.

As illustrated in FIG. 19A, the designation data generation portion 93 according to the present modification example generates the shaping body data FD which causes a set of voxels Vx does not include a part of an inner portion of the outer surface SF. Next, as illustrated in FIG. 19B, the designation data generation portion 93 according to the present modification example provides an external voxel Vx-Ex in the portion which is the inner portion of the outer surface SF and is not included in the set of voxels Vx indicated by the shaping body data FD. Assuming that a block BL is formed in the external voxel Vx-Ex, in a case where the block BL is an edge block BL-EG, a filling proportion RF of the external voxel Vx-Ex is equal to or less than the reference value α1 and equal to or more than the reference value α2, the designation data generation portion 93 generates the designation data SD which causes a light color block BL2 to be formed in the external voxel Vx-Ex.

Modification Example 5

In the above-described embodiment and modification examples, the light color block BL2 is a block BL satisfying a first condition in which the light color block BL2 is an edge block BL-EG formed in an edge voxel Vx-EG, and a second condition in which a filling proportion RF of the edge voxel Vx-EG is equal to or less than the reference value α1 and equal to or more than the reference value α2, but the invention is not limited to such an aspect. The light color block BL2 may be a block BL satisfying a third condition in which, among the six faces of the edge block BL-EG, a face on an opposite side to a face exposed to the outside of the solid object Obj is adjacent to the identical color block BL1 in addition to the first condition and the second condition.

As conditions regarding the light color block BL2, in addition to the first condition and the second condition, by introducing the third condition, it is possible to reduce the possibility that a color of a solid object Obj may be prevented from being visually recognized as a color lighter than a color of a model of the solid object Obj indicated by the model data Dat due to a plurality of light color blocks BL2 being continuously formed.

In the present modification example, in a block BL satisfying the first condition and the second condition, priority of using a light color block BL2 as the block BL is introduced, and the light color block BL2 satisfying the third condition is formed by determining the type of block BL in consideration of the priority.

Specifically, for example, the number of faces of an edge block BL-EG exposed to a subject of a solid object Obj may be used as priority, and an edge block BL-EG having many exposed faces may be preferentially sorted as a light color block BL2. In this case, an edge block BL-EG, such as in the block BL-C illustrated in FIG. 14, of which three faces are exposed is preferentially sorted as a light color block BL2 compared with an edge block BL-EG, such as the block BL-B, of which two faces are exposed. As a result, among projections of irregularities of a surface of a solid object Obj, a vertex portion which has a high possibility of being visually recognized can be constituted of the light color block BL2, and thus it is possible to effectively reduce a rough texture. In addition, as a result, it is possible to prevent a plurality of light color blocks BL2 from being linearly continuously formed on a ridgeline of the irregularities of the surface of the solid object Obj and thus to reduce the possibility that the solid object Obj may be visually recognized as an object having a color lighter than a color of a model of the solid object Obj indicated by the model data Dat.

For example, the extent of the filling proportion RF being lowered may be used as priority, and an edge block BL-EG having a low filling proportion RF may be preferentially sorted as a light color block BL2.

Modification Example 6

In the above-described embodiment and modification examples, the process of specifying an edge voxel Vx-EG in step S300, the process of calculating a filling proportion RF of the edge voxel Vx-EG in step S310, and the process of specifying the type of block BL in step S320 are performed by the designation data generation portion 93 provided in the host computer 9, but the invention is not limited to such an aspect, and the processes may be performed by the control portion 6. In a case where the processes in steps S300 to S320 are performed by the control portion 6, the designation data SD generated by the designation data generation portion 93 may designate formation of a dot with the same content as the content indicated by the shaping body data FD.

In other words, in a case where the designation data SD designates formation of a dot so that an identical color block BL1 having the same color as a color designated by the model data Dat is formed in a voxel Vx, if a block BL formed in the voxel Vx satisfies at least the first condition and the second condition, the control portion 6 according to the present modification example may control an operation of the head unit 3 so that a light color block BL2 is formed in the voxel Vx. The host computer 9 according to the present modification example may supply the designation data SD and the model data Dat to the control portion 6.

As in Modification Example 4, the control portion 6 according to the present modification example may provide an external voxel Vx-Ex and may perform a process of determining whether or not a light color block BL2 is formed in the external voxel Vx-Ex.

Modification Example 7

In the above-described embodiment and modification examples, the solid object Obj shaped by the solid object shaping apparatus 1 includes the outer region LOUT having the colored layer L1 and the shield layer L2, and the inner region LIN having the inner layer L3 and the hollow portion HL, but the invention is not limited to such an aspect, and the solid object shaping apparatus 1 may shape a solid object Obj having at least the colored layer L1.

Modification Example 8

In the above-described embodiment and modification examples, the solid object shaping apparatus 1 shapes the solid object Obj by laminating the shaping body LY which is formed by curing shaping ink, but the invention is not limited to such an aspect. For example, powders which are spread in a layer state may be hardened by curable shaping ink so as to form the shaping body LY, and the solid object Obj may be shaped by laminating the formed shaping body LY.

In this case, the solid object shaping apparatus 1 may include a powder layer forming portion (not illustrated) which forms a powder layer PW by spreading a powder on the shaping platform 45 with a predetermined thickness ΔZ, and a powder removing portion (not illustrated) which removes powders (powders other than powders hardened by the shaping ink) which does not constitute a solid object Obj after forming the solid object Obj. Hereinafter, a powder layer PW for forming a shaping body LY[q] is referred to as a powder layer PW[q].

Figure 20:
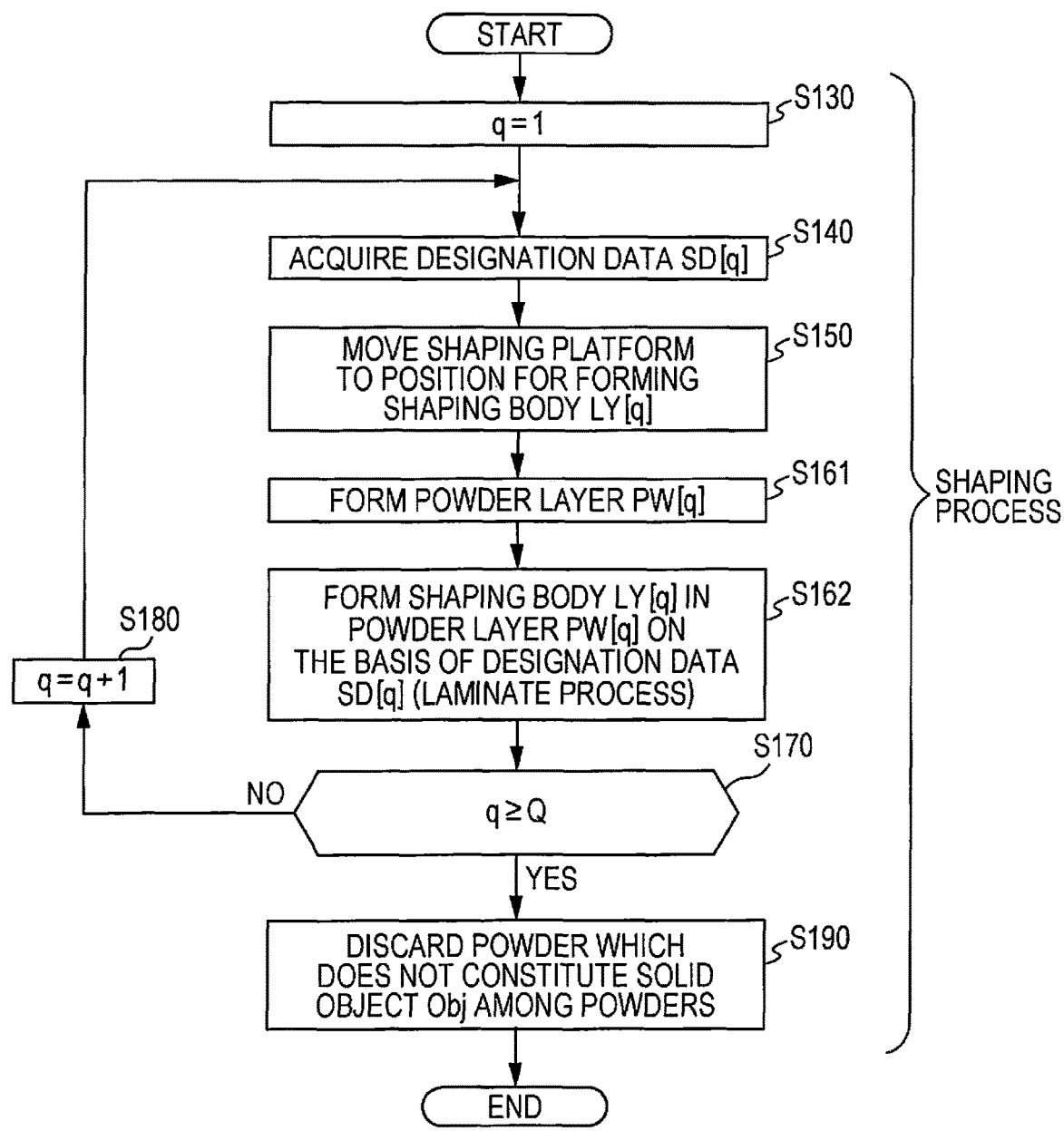
FIG. 20 is a flowchart illustrating a data generation process and a shaping process related to Modification Example 8.

FIG. 20 is a flowchart illustrating an example of an operation of the solid object shaping system 100 in a case where a shaping process according to the present modification example is performed. The shaping process according to the present modification example, illustrated in FIG. 20, is the same as the shaping process according to the embodiment illustrated in FIG. 10 except that processes in steps S161 and S162 are performed instead of step S160, and a process in step S190 is performed if a determination result is affirmative in step S170.

As illustrated in FIG. 20, the control portion 6 according to the present modification example controls an operation of each portion of the solid object shaping apparatus 1 so that the powder layer forming portion forms the powder layer PW[q] (step S161).

The control portion 6 according to the present modification example controls an operation of each portion of the solid object shaping apparatus 1 so that the shaping body LY[q] is formed by forming a dot in the powder layer PW[q] on the basis of the designation data SD[q] (step S162). Specifically, first, in step S162, the control portion 6 generates the waveform designation signal SI by using the designation data SD[q], and controls an operation of the head unit 3 by using the generated waveform designation signal SI so that shaping ink or support ink is ejected onto the powder layer PW[q]. Next, the control portion 6 controls an operation of the curing unit 61 so that powders of a portion of the powder layer PW[q] in which a dot is formed are hardened by curing the dot formed by the ink ejected on the powder layer PW[q]. Consequently, powders of the powder layer PW[q] can be hardened by ink, and thus the shaping body LY[q] can be formed.

The control portion 6 according to the present modification example controls an operation of the power removing portion so that powders which do not constitute the solid object Obj are removed after the solid object Obj is shaped (step S190).

FIGS. 21A to 21F are diagrams for explaining a relationship among the model data Dat, the section model data Ldat[q], the designation data SD[q], the powder layer PW[q], and the shaping body LY[q] according to the present modification example.

FIGS. 21A and 21B are the same as FIGS. 2A and 2B, and exemplify section model data Ldat[1] and Ldat[2]. Also in the present modification example, the section model data Ldat[q] is generated by slicing a model of a solid object Obj indicated by the model data Dat, the designation data SD[q] is generated on the basis of the section model data Ldat[q], and the shaping body LY [q] is formed by a dot which is formed on the basis of the waveform designation signal SI, the waveform designation signal SI being generated by using the designation data SD[q]. Hereinafter, with reference to FIGS. 21C to 21F, a description will be made of formation of the shaping body LY[q] according to the present modification example by exemplifying the shaping bodies LY[1] and LY[2].

As illustrated in FIG. 21C, the control portion 6 controls an operation of the powder layer forming portion so that a powder layer PW[1] with a predetermined thickness ΔZ is formed before forming the shaping body LY[1] (refer to the above-described step S161).

Next, as illustrated in FIG. 21D, the control portion 6 controls an operation of each portion of the solid object shaping apparatus 1 so that the shaping body LY[1] is formed in the powder layer PW[1] (refer to the above-described step S162). Specifically, first, the control portion 6 controls an operation of the head unit 3 on the basis of the waveform designation signal SI which is generated by using the designation data SD[1], and thus dots are formed by ejecting ink onto the powder layer PW[1]. Next, the control portion 6 controls an operation of the curing unit 61 so that the dots formed in the powder layer PW[1] are cured, and thus the shaping body LY[1] is formed by hardening powders of a portion in which the dots are formed.

Thereafter, as illustrated in FIG. 21E, the control portion 6 controls the powder layer forming portion so that a powder layer PW[2] with the predetermined thickness ΔZ is formed on the powder layer PW[1] and the shaping body LY[1]. As illustrated in FIG. 21F, the control portion 6 controls an operation of each portion of the solid object shaping apparatus 1 so that the shaping body LY[2] is formed.

As mentioned above, the control portion 6 controls execution of the laminate process of forming the shaping body LY[q] in the powder layer PW[q] on the basis of the waveform designation signal SI which is generated by using the designation data SD[q], and shapes the solid object Obj by laminating the shaping body LY[q].

Modification Example 9

In the above-described embodiment and modification examples, ink ejected from the ejecting portion D is curable ink such as ultraviolet curable ink, but the invention is not limited to such an aspect, and the ink may be ink made of a thermoplastic resin or the like.

In this case, the ink is preferably ejected in a state of being heated in the ejecting portion D. For example, the ejecting portion D according to the present modification example may perform so-called thermal type ink ejection in which a heat source (not illustrated) provided in the cavity 320 generates heat so as to generate foams in the cavity 320, and thus ink is ejected due to an increase in pressure inside the cavity 320.

In this case, the ink ejected from the ejecting portion D is cooled by ambient air and is thus cured. Therefore, the solid object shaping apparatus 1 may not include the curing unit 61.

Modification Example 10

In the above-described embodiment and modification examples, sizes of dots which can be formed by the solid object shaping apparatus 1 are three kinds of sizes such as a small dot, a medium dot, and a large dot, but the invention is not limited to such an aspect, and sizes of dots which can be formed by the solid object shaping apparatus 1 may be one or more kinds of sizes.

Modification Example 11

In the above-described embodiment and modification examples, the designation data generation portion 93 is provided in the host computer 9, but the invention is not limited to such an aspect, and the designation data generation portion 93 may be provided in the solid object shaping apparatus 1. For example, the designation data generation portion 93 may be installed as a functional block which is realized when the control portion 6 operates according to a control program. In other words, the designation data generation portion 93 may be provided in the control portion 6.

In a case where the solid object shaping apparatus 1 includes the designation data generation portion 93, the solid object shaping apparatus 1 may generate the designation data SD on the basis of the model data Dat which is supplied from an external device of the solid object shaping apparatus 1, and may shape a solid object Obj on the basis of the waveform designation signal SI which is generated by using the generated designation data SD.

Modification Example 12

In the above-described embodiment and modification examples, the solid object shaping system 100 includes the model data generation portion 92, but the invention is not limited to such an aspect, and the solid object shaping system 100 may not include the model data generation portion 92. In other words, the solid object shaping system 100 may shape a solid object Obj on the basis of the model data Dat supplied from an external device of the solid object shaping system 100.

Modification Example 13

In the above-described embodiment and modification examples, the driving waveform signal Com is a signal having the waveforms PL1 to PL3, but the invention is not limited to such an aspect. For example, the driving waveform signal Com may be any signal as long as the signal has a waveform which can cause ink in an amount corresponding to a dot having at least one kind of size to be ejected from the ejecting portion D. For example, the driving waveform signal Com may have waveforms depending on the type of ink.

In the above-described embodiment and modification examples, the number of bits of the waveform designation signal SI[m] is 2 bits, but the invention is not limited to such an aspect. The number of bits of the waveform designation signal SI[m] may be defined as appropriate depending on the number of kinds of sizes of dots formed by ink ejected from the ejecting portion D.

What is claimed is:

1. A solid object shaping apparatus for shaping a solid object by using a plurality of unit shaping bodies, the solid object shaping apparatus comprising:
   a head unit that ejects a liquid containing a colorant component;
   a curing unit that cures the liquid ejected from the head unit so as to form a dot; and
   a control portion that controls the head unit and the curing unit to form the plurality of unit shaping bodies each of which is formed by a single dot or a plurality of dots in a voxel, based on designation data which is formed based on shaping body data representing a model that indicates a shape and a color of the solid object to be shaped as a set of the voxels each having a predetermined rectangular parallelepiped shape and which designates the single dot or the plurality of dots to be formed in the voxel, such that the plurality of unit shaping bodies constituting the solid object include
      a first unit shaping body having an amount of colorant components required to represent the color indicated by the model, and
      a second unit shaping body having an amount of the colorant components which is smaller than the amount required to represent the color indicated by the model, the second unit shaping body has two or more faces of six faces that form a surface of the second unit shaping body and correspond to a surface of the solid object, the second unit shaping body is formed of an inner portion and an outer portion, the inner portion corresponds to a portion inside of a surface of the model and the outer portion corresponds to a portion outside of the surface of the model in the second unit shaping body, and a proportion of the inner portion of the second unit shaping body to the entire second unit shaping body is equal to or less than a first reference value,
   wherein the control portion controls the head unit and the curing unit to form the first unit shaping body that is constituted of a dot formed by a first liquid containing the colorant component,
   wherein the control portion controls the head unit and the curing unit to form the second unit shaping body that is constituted of a dot formed by a second liquid, and
   wherein the first liquid has an amount of the colorant components per unit volume that is larger than the second liquid.

2. The solid object shaping apparatus according to claim 1,
   wherein the six faces forming the surface of the second unit shaping body include two faces forming the surface of the solid object and sharing a single side.

3. The solid object shaping apparatus according to claim 1,
   wherein, among the six faces forming the surface of the second unit shaping body, a face on an opposite side to the face forming the surface of the solid object is adjacent to the first unit shaping body.

4. The solid object shaping apparatus according to claim 1,
   wherein the control portion controls the head unit and the curing unit to form the second unit shaping body that is constituted of the dot formed by the second liquid containing the colorant component, or a dot formed by a third liquid containing the colorant component,
   wherein the amount of the colorant components per unit volume contained in the first liquid is larger than an amount of the colorant components per unit volume contained in the second liquid, and
   wherein the amount of the colorant components per unit volume contained in the second liquid is larger than an amount of the colorant components per unit volume contained in the third liquid.

5. The solid object shaping apparatus according to claim 1,
   wherein, in response to receiving the designation data that designates the single dot or the plurality of dots to be formed in one voxel so that the first unit shaping body is formed in the single voxel, specifying that one unit shaping body formed in the one voxel has two or more faces of six faces forming a surface of the one unit shaping body corresponding to a surface of the solid object, and calculating that the one unit shaping body has the proportion of the inner portion equal to or less than the first reference value, the control portion controls the head unit so that the second unit shaping body is formed in the one voxel.

6. The solid object shaping apparatus according to claim 1,
   wherein when an edge block of the unit shaping bodies, which has two or more faces of six faces that form a surface of the edge block and correspond to the surface of the solid object, is formed of the inner portion inside of the surface of the model and the outer portion outside of the surface of the model, and a proportion of the inner portion of the edge block to the entire edge block is greater than the first reference value, the control portion controls the head unit and the curing unit to form the first unit shaping body as the edge block.

7. The solid object shaping apparatus according to claim 1,
   wherein when an edge block of the unit shaping bodies, which has two or more faces of six faces that form a surface of the edge block and correspond to the surface of the solid object, is formed of the inner portion inside of the surface of the model and the outer portion outside of the surface of the model, the proportion of the inner portion of the edge block to the entire edge block is equal to or less than the first reference value and equal or greater than a second reference value that is smaller than the first reference value, and the second liquid is designated to be ejected to an edge voxel among the voxel to form the edge block, the control portion controls the head unit and the curing unit such that the first unit shaping body is formed as the edge block in the edge voxel.

8. A solid object shaping apparatus comprising:
a head unit that ejects a liquid containing a colorant component;
a curing unit that cures the liquid ejected from the head unit so as to form a dot; and
a control portion that controls the head unit and the curing unit such that a plurality of unit shaping bodies are formed by using the dot, and a solid object corresponding to a shape and a color indicated by a model is formed by using the plurality of unit shaping bodies,
the plurality of unit shaping bodies constituting the solid object include
a first unit shaping body having an amount of colorant components required to represent the color indicated by the model; and
a second unit shaping body having an amount of the colorant components which is smaller than the amount required to represent the color indicated by the model, and, in the second unit shaping body, two or more faces of six faces forming a surface of the second unit shaping body correspond to a surface of the solid object, the second unit shaping body is formed of an inner portion and an outer portion, and the inner portion corresponds to a portion inside of a surface of the model and the outer portion corresponds to a portion outside of the surface of the model in the second unit shaping body,
wherein when an edge block of the unit shaping bodies, which has two or more faces of six faces that form a surface of the edge block and correspond to the surface of the solid object, is formed of the inner portion inside of the surface of the model and the outer portion outside of the surface of the model, and a proportion of the inner portion of the edge block to the entire edge block is equal to or less than a first reference value and equal or greater than a second reference value that is less than the first reference value, the control portion controls the head unit and the curing unit to form the second unit shaping body as the edge block.

9. A solid object shaping apparatus for shaping a solid object by using a plurality of unit shaping bodies, the solid object shaping apparatus comprising:
a head unit that ejects a liquid containing a colorant component;
a curing unit that cures the liquid ejected from the head unit so as to form a dot; and
a control portion that controls the head unit and the curing unit to form the plurality of unit shaping bodies each of which is formed by a single dot or a plurality of dots in a voxel, based on designation data which is formed based on shaping body data representing a model that indicates a shape and a color of the solid object to be shaped as a set of the voxels each having a predetermined rectangular parallelepiped shape and which designates the single dot or the plurality of dots to be formed in the voxel, such that the plurality of unit shaping bodies constituting the solid object include
a first unit shaping body having an amount of colorant components required to represent the color indicated by the model, and
a second unit shaping body having an amount of the colorant components which is smaller than the amount required to represent the color indicated by the model, the second unit shaping body has two or more faces of six faces that form a surface of the second unit shaping body and correspond to a surface of the solid object, the second unit shaping body is formed of an inner portion and an outer portion, the inner portion corresponds to a portion inside of a surface of the model and the outer portion corresponds to a portion outside of the surface of the model in the second unit shaping body, and a proportion of the inner portion of the second unit shaping body to the entire second unit shaping body is equal to or less than a first reference value,
wherein when an edge block of the unit shaping bodies, which has two or more faces of six faces that form a surface of the edge block and correspond to the surface of the solid object, is formed of the inner portion inside of the surface of the model and the outer portion outside of the surface of the model, and a proportion of the inner portion of the edge block to the entire edge block is equal to or less than the first reference value and equal or greater than a second reference value that is less than the first reference value, the control portion controls the head unit and the curing unit to form the second unit shaping body as the edge block.

10. The solid object shaping apparatus according to claim 9,
wherein the control portion controls the head unit and the curing unit not to form the edge block when the proportion of the inner portion of the edge block to the entire edge block is less than the second reference value.

* * * * *